United States Patent
Little et al.

(10) Patent No.: US 6,219,789 B1
(45) Date of Patent: *Apr. 17, 2001

(54) MICROPROCESSOR WITH COPROCESSING CAPABILITIES FOR SECURE TRANSACTIONS AND QUICK CLEARING CAPABILITIES

(75) Inventors: Wendell Little, Denton; Andreas Curiger, Dallas; Stephen N. Grider, Argyle; David A. Bunsey, Dallas; James E. Bartling, Dallas; Shyun Liu, Dallas; Bradley M. Harrington, Carrollton, all of TX (US)

(73) Assignee: Dallas Semiconductor Corporation, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/153,475

(22) Filed: Sep. 15, 1998

Related U.S. Application Data

(63) Continuation of application No. 08/683,937, filed on Jul. 19, 1996, now Pat. No. 5,832,207.
(60) Provisional application No. 60/001,279, filed on Jul. 20, 1995, provisional application No. 60/001,277, filed on Jul. 20, 1995, and provisional application No. 60/001,278, filed on Jul. 20, 1995.

(51) Int. Cl.[7] ............................... G06F 11/30; H04L 9/00
(52) U.S. Cl. ............................................................. 713/200
(58) Field of Search .................................... 713/200, 201; 714/5, 29, 42, 54

(56) References Cited

U.S. PATENT DOCUMENTS

| | | | |
|---|---|---|---|
| 4,145,760 | 3/1979 | Ward et al. | 365/226 |
| 4,747,139 | 5/1988 | Taaffe | 380/44 |
| 4,996,411 | 2/1991 | Rebjock | 235/488 |
| 5,045,675 | 9/1991 | Curry | 235/441 |
| 5,146,499 | * 9/1992 | Geffrotin | 380/23 |
| 5,297,099 | 3/1994 | Bolan et al. | 365/229 |
| 5,832,207 | * 11/1998 | Little et al. | 395/186 |
| 5,903,721 | * 5/1999 | Sixtus | 395/187.01 |
| 5,960,085 | * 9/1999 | De La Huerga | 380/25 |
| 6,003,135 | * 12/1999 | Bialick et al. | 713/201 |

FOREIGN PATENT DOCUMENTS 0 616 281 A2  3/1994  (EP).

\* cited by examiner

*Primary Examiner*—Dieu-Minh T. Le
(74) *Attorney, Agent, or Firm*—Jenkens & Gilchrist, A Professional Corporation

(57) ABSTRACT

An electronic module having at least a microprocessor and co-processor on a single integrated circuit. The electronic module can be contained in a small housing. The electronic module provides secure bidirectional data communication via a data bus. The electronic module may include an integrated circuit comprising a microprocessor, and a co-processor adapted to handle 1,024-bit modulo mathematics primarily aimed at RSA calculations. The electronic module is preferably contained in a small token sized metallic container and will preferably communicate via a single wire data bus which uses a one-wire protocol.

10 Claims, 15 Drawing Sheets

SLAVE ONE WIRE UART BLOCK DIAGRAM

Slave One Wire ROM Function Flow Chart

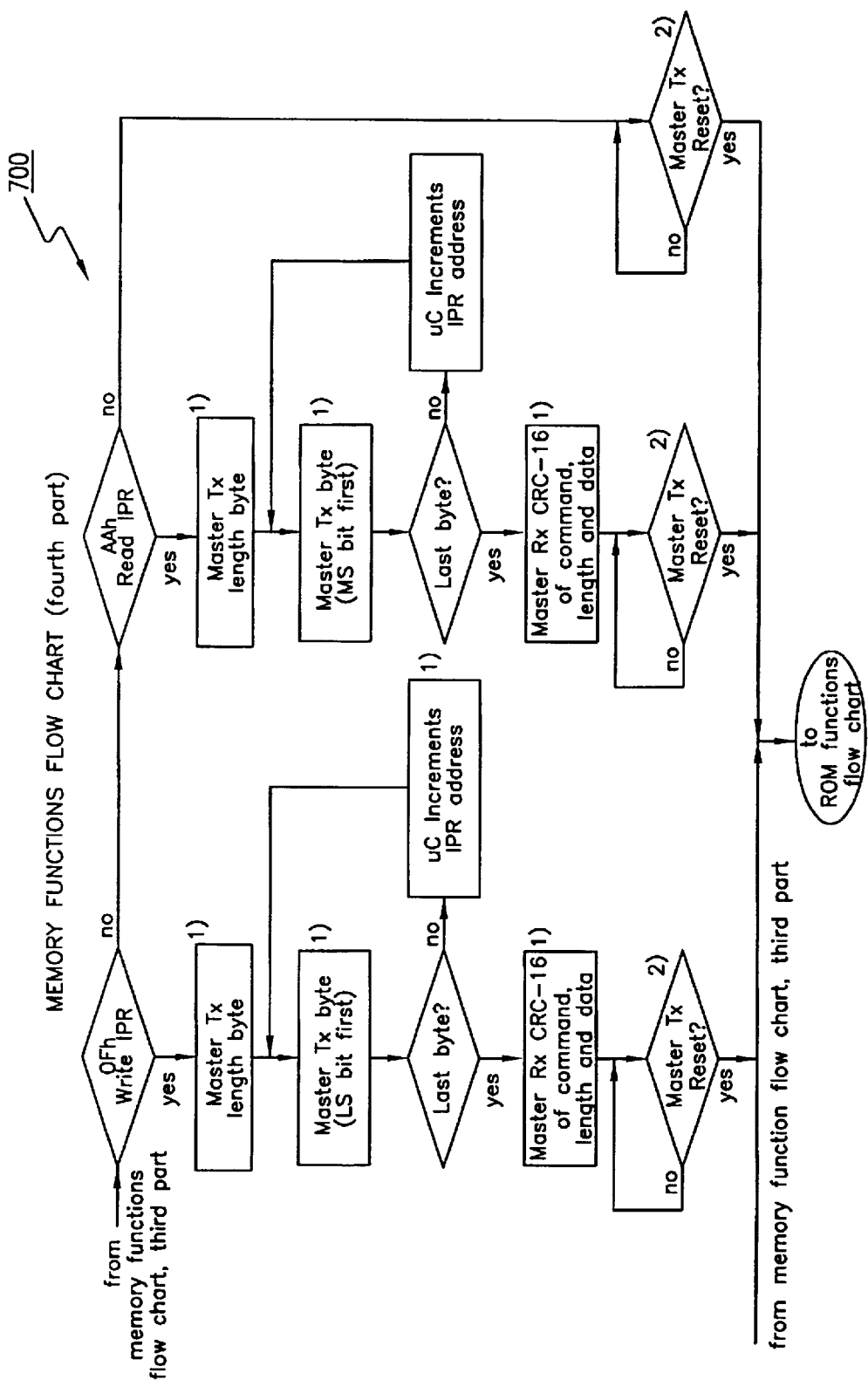

MICROPROCESSOR WITH COPROCESSING CAPABILITIES FOR SECURE TRANSACTIONS AND QUICK CLEARING CAPABILITIES

This application is a continuation of application Ser. No. 08/683,937, filed Jul. 19, 1996, which claims priority from Provisional Application Ser. No. 60/001,279 filed Jul. 20, 1995 and Provisional Application Ser. No. 60/001,277 filed Jul. 20, 1995 and Provisional Application Ser. No. 60/001,278 filed Jul. 20, 1995.

CROSS REFERENCE TO RELATED APPLICATIONS

This application is related to the following:

Application Ser. No. 60/001,279, filed Jul. 20, 1995, which is a provisional application of U.S. Pat. No. 5,998,858, issued on Dec. 7, 1999, entitled MICROCIRCUIT WITH MEMORY THAT IS PROTECTED BY BOTH HARDWARE AND SOFTWARE;

Application Ser. No. 60/001,278, filed Jul. 20, 1995, which is a provisional application of application Ser. No. 08/683,949, filed Jul. 19, 1996 entitled SINGLE CHIP MICROPROCESSOR, MATH-COPROCESSOR, RANDOM NUMBER GENERATOR, REAL-TIME CLOCK AND RAM HAVING A ONE-WIRE INTERFACE; and Application Ser. No. 60/001,277, filed Jul. 20, 1995, which is a provisional application of U.S. Pat No. 5,850,450, issued on Dec. 15, 1998, entitled METHOD AND APPARATUS FOR ENCRYPTION KEY CREATION.

All cross references are filed on even date herewith, assigned to the assignee of the present invention and hereby incorporated by reference as if reproduced in their entirety.

BACKGROUND OF THE INVENTION

1. Technical Field of the Invention

The present invention relates to an electronic module having at least a microprocessor and co-processor on a single integrated circuit. The electronic module can be contained in a small housing. The electronic module provides secure bidirectional data communication via a data bus. More specifically, the present invention relates to an electronic module which includes an integrated circuit comprising a microprocessor, and a co-processor adapted to handle 1,024-bit modulo mathematics primarily aimed at RSA calculations. The electronic module is preferably contained in a small token sized metallic container. The present invention will preferably communicate via a single wire data bus which uses a one-wire protocol.

2. Description of Related Art

Encryption of data has been around for hundreds of years. Encryption may even date back as far as several hundred B.C. More recently, the American Indians used smoke signals. In all forms, the concept of encryption takes a given set of information that is readily understandable by an average person and converts that information into a form that is not understandable except to those people that have the capability to reconfigure the converted information back into an understandable state. Encryption has been used readily during war time. In the second world war, the Nazi's had a machine called Enigma. Information was placed into the Enigma machine and encrypted information came out. No one could understand the encrypted information unless they had another Enigma type machine to convert the encrypted information back to an understandable format.

Today there are secure "boxes" that are manufactured and sold to the government for data communication across telephone lines. Drawbacks of the secure boxes is that they are large and not secure in the particular environment that they are used in. In other words, the boxes may be capable of creating, sending, and receiving data that is secure, but the box itself may not be secure.

The personal computer industry offers software and personal computers that create, send, and receive secure data. The software operates in conjunction with a generic computer. Again, the data that is sent or received is secure, but the computers are not secure.

There is hardware designed specifically to create, send, and receive secure data. The hardware is relatively secure, but is generally large in size, heavy and expensive. Even laptop size computers are considered to be large. Thus, the main drawbacks of present day systems that create, send and receive secure data is their large size, and the limited amount of security provided.

SUMMARY OF THE INVENTION

The present invention is an electronic module that comprises a one wire (single wire) interface for bidirectionally interfacing the electronic module with another electronic device. The one wire interface is connected to a one wire UART. The UART is connected to a microprocessor and a co-processor and a memory circuit.

The electronic module is rather small and can be a single chip integrated circuit that has dimensions of less than 400 mils by 220 mils. Although the module may need a small amount of energy to maintain the memory, the majority of the energy required by the electronic module is obtained parasitically from the one wire bus.

The electronic module's coprocessor can handle encryption mathematics such as modulo math for RSA encryption.

The electronic module is small enough to be installed in a container or other object having dimensions similar to that of 3 or 4 dimes stacked on top of each other or smaller.

The electronic module provides a secure environment to store information and will erase such information if the module is tampered within an unauthorized way. The electronic module also provides a means for securely sending, receiving and transferring information used for signatures, money transaction, access devices, medical information, personal or secret information, postage metering, inventory, etc.

BRIEF DESCRIPTION OF THE DRAWINGS

A more complete understanding of the method and apparatus of the present invention may be had by reference to the following Detailed Description when taken in conjunction with the accompanying Drawings wherein:

FIGS. 7A, 7B, 7C, and 7D depict a flow chart indicating an exemplary operation of the one wire UART;

DETAILED DESCRIPTION OF A PRESENTLY PREFERRED EXEMPLARY EMBODIMENT

A preferred embodiment of the present invention is a secure electronic module capable of creating, sending, and receiving secure data. The electronic module of the present invention is small. In fact in at least one embodiment, the electronic module is approximately the size of a small stack of nickels or dimes (i.e., 3–4 nickels or dimes stacked on one another or smaller), is portable and highly secure with respect to unauthorized hardware and software entry.

The present electronic module is capable of performing large encryption calculations for the purpose of transferring data securely. The preferred electronic module is reasonably fast in the sense that it can encrypt or decrypt a block of data rapidly in part due to a co-processor's capabilities. The present invention is preferably meant to handle blocks of data having a size range of 128 to 256 bytes of data. It is understood that the present invention could be designed to handle much larger blocks of data if the memory associated with the module is increased in size.

Figure 1:
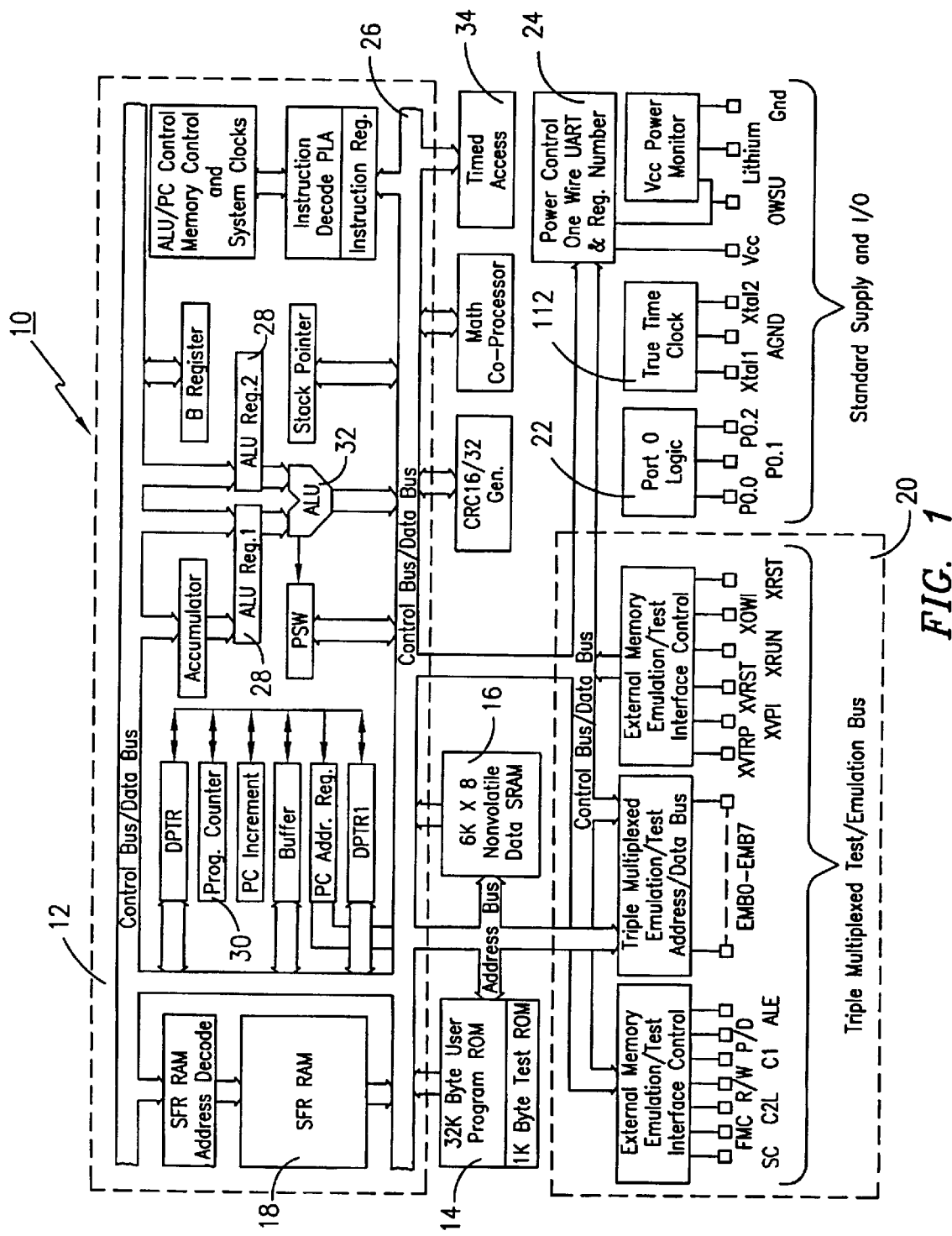
FIG. 1 depicts a block diagram of an exemplary electronic module.

Referring to FIG. 1, the preferred exemplary embodiment of the present secure electronic module 10 is depicted in the block diagram. The secure module 10 is generically a microcomputer. Within the microcomputer framework there are major constituent blocks that make up the exemplary secure module.

The first important block is the microprocessor core 12 which is where the majority of calculations are performed and where the other circuitry in the module is controlled. The calculations performed in the microprocessor core 12 are not the same as the calculations performed in the co-processor block (discussed later), but instead are for running the 8-bit instructions associated with the firmware within read only memory (ROM) 14 in the module.

The memory in the module exists in three (3) different forms: being the program memory 14, the data memory 16, and the SFR memory 18. The program memory 14 is preferably a 32K byte user programmable ROM. The data memory 16 is where data is manipulated and stored in large volumes. The data memory is preferably a 6K by 8 non-volatile SRAM block. It is understood that the memory sizes could be any useful size and is purely an engineering choice.

The SFR memory 18 is preferably a "special function register" (SFR) style memory. The SFR memory map is used to support the core microprocessor to execute instructions. The SFR-SRAM block of memory is therefore preferably located in the microprocessor core block 12. Other SFR registers are located in various blocks of the module in order to aid the functions of those blocks without interfering with the operation of the microprocessor core 12.

It is understood that SRAM memory is the preferred data memory 16 configuration in the exemplary embodiment, but one could use a wide variety of memory configurations including EEPROM, EPROM, ferule electronics, or any conventional read/write non-volatile SRAM would also work. SRAM is preferred because it allows the tightest packing of memory circuitry in silicon.

Furthermore, non-volatile SRAM is preferably used because it can be quickly destroyed if the power(preferably a battery or other energy source) that backs the SRAM up is discontinued momentarily. One of the many features of this invention is that if the module is tampered with, the memory is wiped clean within a single time frame of a few nanoseconds.

Another block of circuitry in the exemplary secure module is the emulation and test interface circuitry 20. The emulation and test circuitry 20 allows the secure module 10 to operate on program memory 14 and data memory 16 that is connected to the integrated circuit via a bus interface. The bus interface is only used for emulation and testing of the secure module. After the secure module 10 has been tested, the emulation and test circuitry is disabled by blowing laser fuses or another type of permanent disconnection means and thereby disconnecting the test and emulation circuitry 20 from the other circuitry in the secure module 10 so that a "back door" to the secure module is eliminated.

Another block is the port logic circuitry 22. The exemplary embodiment has at least one general purpose port pin connected to port logic circuitry 22. The general purpose port pins and the port logic circuitry 22 operate within the framework of the peripheral SFR memory. They are placed in the exemplary secure module 10 primarily so that this secure module 10 can be tested and can be used in future uses of the exemplary secure module. Such future uses could be interfacing the module with additional external memories on separate integrated circuits via a three wire interface. The port logic circuitry 22 and the general purpose port pins could also be used to talk to a very large amount of memory that is distally connected to the secure electronic module 10.

For example, if the nonvolatile RAM incorporated into the exemplary secure module was deemed to not be large enough and the integrated circuit was densely populated with circuitries so that more memory could not be added to it, one of ordinary skill in the art could add an external 8K by eight or 32K by eight memory chip that has a 3-wire interface on it as opposed to a full multiplexed or de-multiplexed address bus, used by standard generic memories, such that the exemplary chip can then address the additional external memory and thereby expand the capability of the electronic module 10.

The exemplary electronic module preferably has an identification number (ID number) and what is termed as the "front end" of the one-wire section of the One Wire UART. This is depicted in the FIGURE in the power control One Wire UART and registration number circuitry 24. The ID is accessible through the OWSU pin which stands for the one wire slave UART pin. The identification number is established by lasering fuses within the integrated circuit thereby creating a permanent, non-volatile encoded ID number of 64-bits. The ID number can be a unique number and is located in this portion of the circuitry, near the one wire interface, primarily to provide the exemplary secure electronic module 10 with the ability to be quickly read and to establish an ID during a one-wire communication. Furthermore, the ID is used in association with the data protocol of the one-wire bus which is used by the exemplary secure module 10. It is understood that the ID number can be incorporated into a different area of the secure electronic module's integrated circuit. The ID could be created in another fashion other than with laser fuses. The ID could be stored into a set of ROM memory cells, but a concern would be that the cells could be duplicated in all the manufactured chips thereby not providing a unique ID number. On the other hand, such duplication would be useful if one wanted a common ID for a large number of electronic modules. The ID could also be expressed in any one of the various non-volatile memories, including SRAM, EEPROM, flash memory, EPROM, feral electric, feral magnetic, etc., types of memories. If the ID is loaded into a memory during the manufacture of the secure electronic module, then the module electronics could be designed to allow the one wire slave UART to read that portion of memory directly. Thus, one of ordinary skill in the art would understand that there are many manifestations of where the ID could exist within the secure module electronics. Again, in the exemplary embodiment it is preferred that it is placed as lasered fuses in the one wire UART because it is part of the one wire protocol and allows the electronic module to be identifiable.

Referring again to FIG. 1, the microprocessor core block 12 communicates with other circuitry blocks via a control/databus 26. The databus 26 in the preferred embodiment is a standard 8051 interface bus which is internal to the integrated circuit. The data bus basically provides an eight bit data package when the microprocessor core 12 is talking to the SFR memory 18. Addresses are transferred across the data bus 26 in a multiplexed fashion and then data is carried on the bus and read or written to a memory location. In another form of the present exemplary embodiment, the microprocessor core 12 could output a sixteen bit address field which is not directly used by the SFR memory map, but instead is used within the data memory map and the program memory map.

There are few memory maps found in the preferred exemplary embodiment. First, there is the program memory map which is a general purpose memory whose locations are accessed by a sixteen bit address bus that comes from the microprocessor core and in particular from the PC address register. The PC address register has incorporated within a program counter which provides an address so that the microprocessor can sequentially go through the different locations within the program memory via this sixteen bit number that comes out of the program counter. The data that comes out of the program RAM or EPROM, or other form of memory, is communicated on the data bus 26 and received by one of the ALU's instruction registers 28 so that the code can be executed. In a similar fashion, another memory map, the data memory map, works in parallel with the program memory 14. The address which comes out of the program counter 30, also addresses the data memory map. The data from the memory map is provided to the data bus. The ALU 32 decides which memory is to be used based on the type of instruction that is being executed by the microprocessor core 12.

There is a third memory map in the preferred embodiment which is a special function register memory map or the "SFR" memory map. The SFR memory map is handled differently than the program memory map and the data memory map in the microprocessor core 12. The SFR memory map is limited, in the exemplary embodiment, to 256-bites of memory. The reason for the limitation is that the SFR memory map works on a multiplexed scheme. That is, the addresses from the microprocessor core 12 are output on the databus 26 during different timeslots. All the peripheral circuits around the microprocessor core 12 are looking for potential addresses on the databus 26 during these particular time slots. The peripheral circuits know that the addresses are not going to be data during the timeslots. The peripheral circuits decode the address and, if appropriate, will combine the address with additional control signals from the microprocessor core 12 so that the peripheral blocks understand what to do. Once the address is decoded by the peripheral blocks, the responding peripheral block will either read or write from the databus.

The three different types of memory maps all work under the 8051 microprocessor style architecture and are used in the exemplary embodiment because of the ability of the 8051 microprocessor architecture to do data transfers and to bring instructions to peripheral blocks in very few clock cycles.

It is understood that the present invention uses a microprocessor architecture that has been termed in the art as a Harvard Architecture. It is also understood that other architectures could be used such as a single memory map microprocessor which is used in Motorola microprocessor designs. The single memory map microprocessor is termed a Von Newmann Architecture.

Still referring to FIG. 1, other blocks outside of the microprocessor core 12 will now be discussed. The timed access block 34 is included in the exemplary embodiment because it is relevant to the control of the circuits on the integrated circuit. The timed access circuitry 34 provides a periodic "sobriety test" for the software/hardware operation. In other words, the timed access circuitry is used to make sure that the software and hardware are working together correctly. The timed access circuitry 34 is different from a watchdog timer. The timed access circuitry 34 makes sure that specific functions within the integrated circuit are happening within predetermined amounts of time. If the functions are occurring outside the predetermined windows of time, then the timed access circuit 34 will alarm. One of the results of an alarm from a timed access circuit is that the memory in the exemplary embodiment could be erased.

Figure 3:
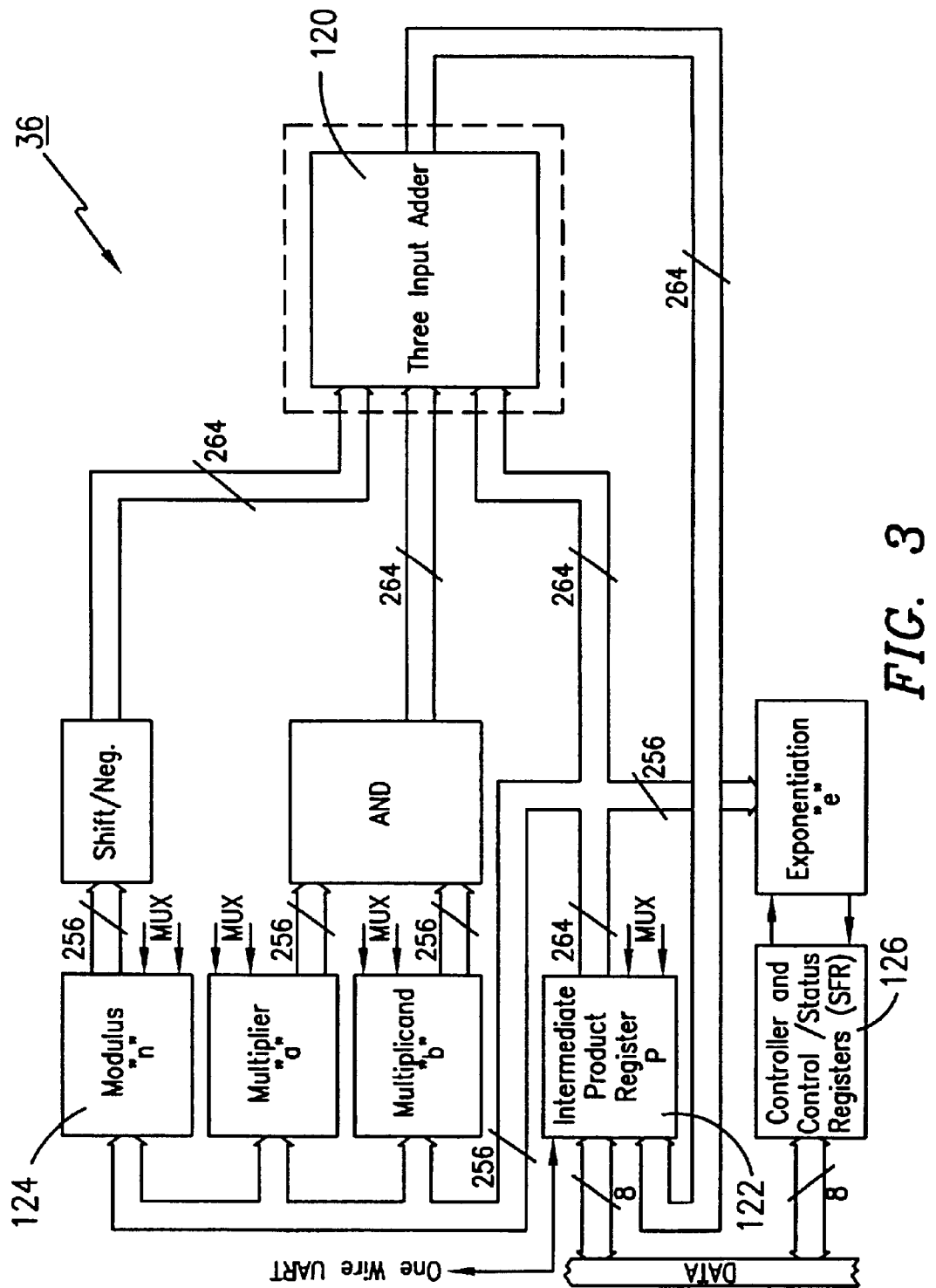
FIG. 3 depicts an exemplary block diagram of a modulo mathematics math coprocessor.

The math co-processor circuitry 36 is used to perform RSA Modulo mathematics. FIG. 3 depicts a blown up version of the multiple blocks within the math co-processor 36. The specific importance of the math co-processor 36 is that it allows high speed calculations of very large numbers within the electronic module 10. The math co-processor circuitry 36 supports RSA Modulo mathematics for 1,024-bit numbers. The modulo mathematics are performed by using eight bit multipliers and an eight bit adder and other electronic circuitry which will be described later in this application. The preferred embodiment is capable of performing the modulo mathematics with the very large numbers in a time frame of less than a second. In order to accomplish such a high speed mathematical calculation, it is performed via hardware instead of software. The hardware can speed up the calculation by many orders of magnitude. The hardware in the math co-processor operates on data words that are 1,024-bits long. As a result, there are several registers in the multiplier that are 1,024-bits long. The multiplier in the preferred exemplary embodiment does not use a series chain of adders that are 1,024-bits long because such circuitry would require too much space on the integrated circuit. Instead, the co-processor of the exemplary embodiment uses a four-pass effect. In other words, the co-processor performs a 256-bit add, which in actuality, is a 264-bit add, because there is an additional carry propagation relationship, and the co-processor makes four passes through the 256-bit add circuitry to thereby effectively add 1,024-bits. It is understood that one could design a 1,024-bit adder, but the preferred design uses a four pass 256-bit adder with carry cells which is designed to perform RSA encryption calculations using modulo mathematics.

It is understood that the math co-processor could be designed to perform a variety of encryption algorithms that are mathematically based.

Figure 2A:
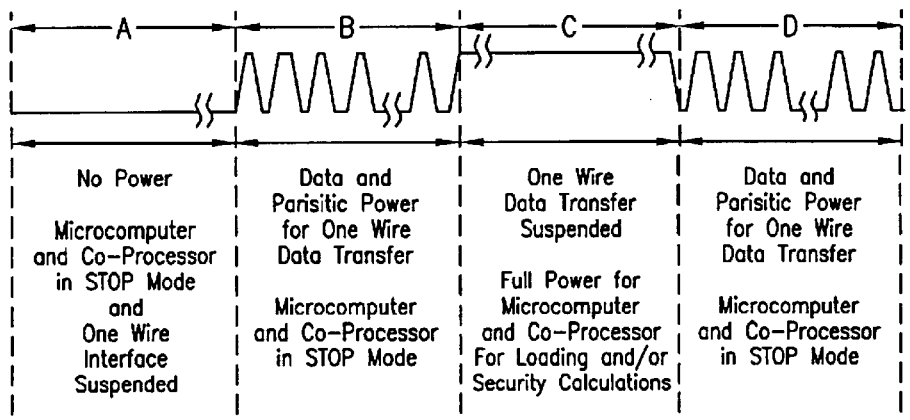
FIG. 2a depicts an exemplary description of how the electronic module uses parasitic power.
Figure 2:
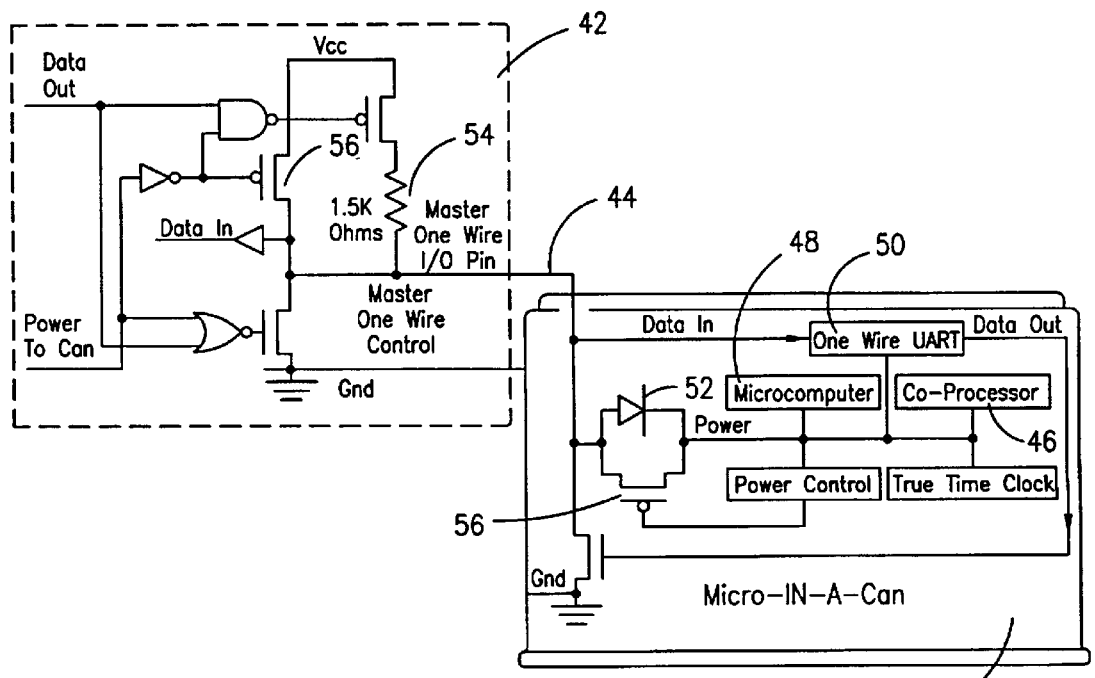
FIG. 2 depicts an exemplary electronic module and a one wire connection to a host/master circuit.

FIG. 2 provides a view of the exemplary embodiment installed in a small housing or "can" 40. The can 40 is preferably a steel can that is both conductive and durable. It is desirable that the can 40 be small and portable. The details of a block diagram drawn within the can 40 in FIG. 2 represent the electronic module 10 of the preferred exemplary invention. The area outside of the can 40 delineated by the dotted line represents a configuration associated with a "master" 42. The master 42 comprises circuitry that communicates with the electronic module 10 of the present invention. FIG. 2 depicts and provides an understanding of how the present invention uses a single wire or contact 44 (along with a ground wire) to perform both communication between the master 42 and the electronic module 10 and to power the electronic module 10. For example, the electronic module 10 can parasitically extract power off the "ones" that are sent over the single wire 44 communication so that the electronic module 10 can continue to operate when zeros are sent over the one wire bus 44. Thus, the exemplary electronic module 10 can operate on a current that is very low. In fact, the operating current of the exemplary one wire module device 10 via parasitic absorption of energy during a one wire communication is very low. It is determined that the operating current of the electronic module 10 can be lower than a few hundred microamps under certain conditions.

During a non-communication over the single wire bus, the high speed co-processor 46 and the high speed microprocessor 48, which are attached to the one wire interface circuit, are all operating at the same time. The exemplary electronic module would require between 25 and 40 milliamps of current. The voltage required by the exemplary electronic module can vary. The voltage required will range between as high as six (6) and as low as two and one-half (2½) volts. If the voltage drops below two and one-half volts, a band gap circuit will stop operation of the electronic module.

FIG. 2 also depicts a one wire UART 50. There are two facets to the one wire UART 50. There is the technique in which the one wire UART 50 obtains power from the one wire bus 44 and there is the facet related to how the one wire UART 50 transfers data over the one wire bus 44. Looking at both FIGS. 2 and 2A, it is important that the microprocessor 48 and co-processor 46 be supplied with high energy in order to operate. At the same time, the electronic module 10 has the ability to parasitically get data from the one wire bus 44 while the microprocessor 48 and co-processor 46 are not running in a time multiplexed fashion. When the electronic module 10 is first connected to a host 42, the microprocessor 48 and co-processor 46 are in a static state. That is, they are not operating. At the same time, the one wire UART 50 begins to operate on very little current. The one wire UART 50 is parasitically powered from the data on the one wire bus 44 where data from the bus is read. The data is received in the one wire UART 50 and then a final command is sent from the master 42 to the electronic module. The final command wakes up the microprocessor 48. The master 42, knowing that the microprocessor 48 is about to come on line, sends a signal on the power line so that the circuitry in the master is switched to provide the electronic module enough energy to operate the microprocessor 48 and co-processor 46 functions via the single wire connection 44. The circuitry of FIG. 2 will be described in more detail later in this specification.

It is understood that the present invention is not limited to a single wire connection between a master/host and the electronic module. Furthermore, the present invention is not limited to the one wire protocol for communication over a single wire. The present invention could use more than one wire to communicate between the electronic module and the master. You could use two, three, five or more wires to communicate. It is preferred that a single wire or connection is used because a single wire connection is less expensive to manufacture and can be made much more durable than a multiple wire connection.

Figure 4:
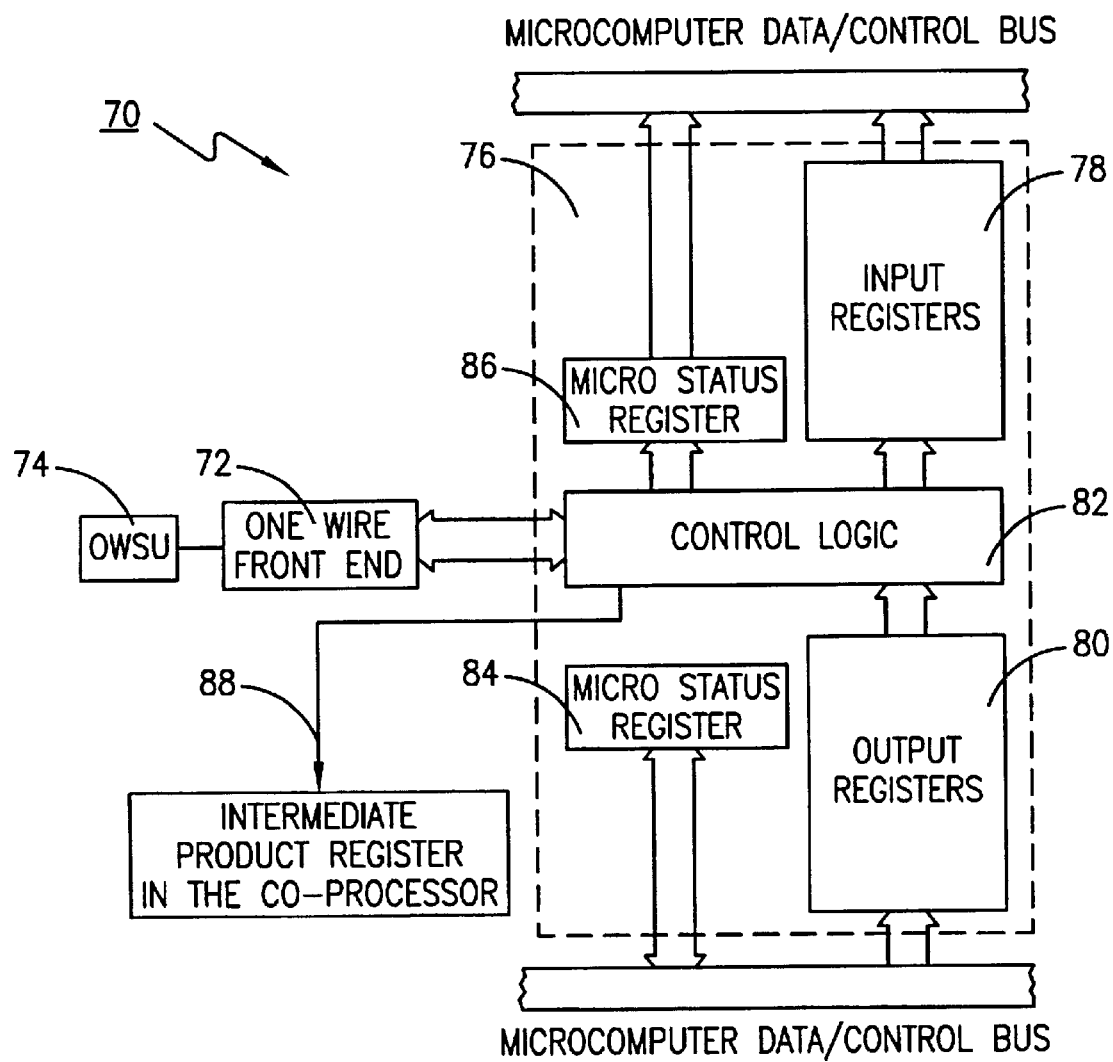
FIG. 4 depicts an exemplary one wire UART block diagram.

FIG. 4 is a slave one wire UART 70 block diagram. The one wire UART 70 is in two sections. One is the one wire front end 72 which connects to the OWSU pad 74 ("one wire slave UART"). The other part of the slave one wire UART block diagram is a memory area with control logic called the data read write area 76. The one wire front end 72 provides standard routine protocols used in one wire communications. The data read write area 76 is composed basically of four to five areas. Two of them are an input register 78 and an output register 80. The input register 78 and output register 80 are similar to circular buffers. Preferably, the registers are eight to sixteen bites large. The input registers 78 and output registers 80 are provided such that the microprocessor can write into the output registers 80 and the master 42 can access the output registers 80 via control logic 82 and the one wire front end 72, thereby, reading the output registers 80. Furthermore, the master 42 can write data through the logic in the one wire front end 72 and deposit the data into the input registers 78. The input registers 78 can then be read by the microprocessor core and acted upon accordingly. There are two status registers: One of which is the micro status register 84 which allows the microprocessor core to send status information to the one wire front end 72 and then sent out to the master 42 via the one wire bus. Also, the master 42 can send data through the one wire front end 72 into the second status register, the UART status register 86 for the microprocessor to read. The status registers are used for status in control relationships and the input and output registers are used primarily for data. It is understood that the input and output registers could also be used for commands and data based on how the commands or data are formatted.

Still referring to the UART 70 in FIG. 4, there is an intermediate product register line 88 electronically connected to the control logic of the UART. The other end of the intermediate product register is connected to the co-processor. The intermediate product register, is used to enable a master to send data directly to the co-processor or receive data directly from the co-processor on a block basis. The blocks are preferably 1,024-bits long. Thus, data can be provided directly from the host, the co-processor or co-processor to the host without using a majority of the circuitry in the UART.

The intermediate product register and the co-processor are serial shift registers but could also be designed for a parallel bus.

The ability to read and write to the intermediate product register is strictly controlled by a set of slave UART pins that are specifically associated with reading and writing data directly to the co-processor. The pins are necessary because of the very secure nature of the data that may be transferred directly from the master to the co-processor and vice versa. For example, the co-processor may have just finished doing a specific calculation and the number that is the result of the calculation may be a number that should not be seen by the outside world including the master. Thus, such a number would not be allowed to be transmitted via the intermediate product register to the master. An example of such a number would be when the exemplary electronic module is creating a new set of RSA encryption key pairs. In a nutshell, the master must request and provide a reason for obtaining data directly from the co-processor. The slave microprocessor will allow the master to obtain the data directly only after it understands what type of data is going to be transferred.

Figure 5:
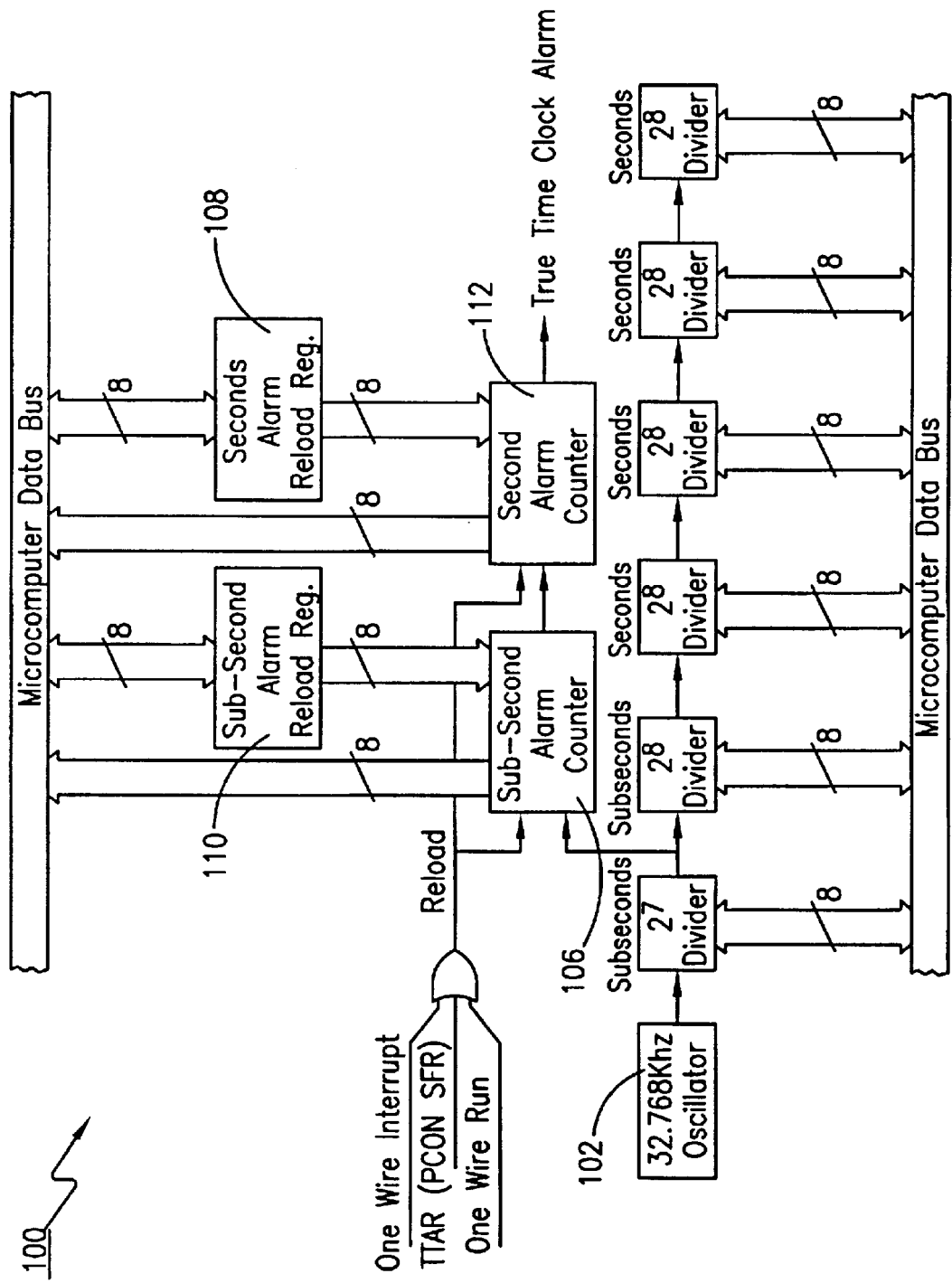
FIG. 5 depicts an exemplary real time clock block diagram.

In FIG. 5, a real time clock block diagram is depicted. The real time clock 100 is composed of a series of flip flops. The flip flops basically divide down a 32.768 kilohertz oscillator 102 in six stages. Five of the stages are $2^8$ dividers and one is a $2^7$ divider. By having six stages, a very long countdown is provided. Furthermore, the real time clock 100 is designed so that once it starts counting, it never stops (unless its power source is taken away). The real time clock 100 can only be stopped in a test mode during production of the product, but the test mode relationship is destroyed when the electronic module 10 becomes a permanent product and is sent to customers. Destruction of the stopping feature in the test mode is done via the use of lasers and/or metal fuses.

The purposes of the real time clock 100 is it is a means to keep actual time in the electronic module 10. The actual time is determined via an offset value stored in RAM that is compared with the result of the real time clock's counter value so that an actual time can be determined, be it Greenwich time, Central Daylight Time, or some other time keeping relationship.

As depicted in FIG. 5, there is a pickup 104 after the $2^7$ divider which was provided to a series of alarm counters. The alarm counters have eight flip flops followed by eight more flip flops to eventually give a true time clock alarm relationship. The sub-second alarm register 106 and the second alarm reload register 108 are used to set a multiplex scheme which is adhered to between the master and the electronic module (slave). The master and slave agree to the amount of time between communications over the single wire communication bus. The alarm registers will trigger interrupts to the microprocessor so that the microprocessor will shut down prior to the master sending more data so that power can be efficiently utilized within the electronic module 10.

The 32.768 kilohertz oscillator 102 is preferably a crystal oscillator, but could be any equivalent circuit. For example, the oscillation signal could be brought into the electronic module via an electronic source or it could be generated by a circuit built into the integrated circuit such as a tank circuit. Preferably, the real time clock 100 will have an accuracy of plus or minus three minutes a month and will continuously operate from the time the product is initially manufactured and tested until the time the electronic module 10 is put out of service.

Referring back to FIG. 1, the CRC 16/32 generator 110 will now be discussed. The CRC 16/32 generator 110 performs a cyclic redundancy check that is used for error correction. The CRC 16/32 generator 110 is similar to a standard form of a CRC 16 and a CRC 32 which are well known in the art. This CRC 16/32 generator 110 is controlled by microprocessor core 12 through the SFR registers 18. Data enters the CRC 16/32 generator 110 via the SFR registers 18 and then calculations are made.

Referring again to FIG. 2, the electronic module (data module) 10 which incorporates the security microcomputer 48 and the one wire UART 50 operate in a multiplexed fashion. In simple terms, the One Wire UART 50 operates on incoming data while the microcomputer 48 and co-processor 46 remain in a STOP mode, as seen in time period B and D of FIG. 2A. Once data has been transferred, the microcomputer 48 and co-processor 46 are enabled to process the data (period C). After the data processing has been completed, the microcomputer 48 and co-processor 46 return to a low power STOP mode and the resulting data is then extracted from the One Wire UART 50, by the Master One Wire Control 42, (period D). The amount of data and the required calculations associated with the data will govern the number of periods (B and C) that the Master 42 and the electronic module 10 will use to transfer and process data. The time associated with period C depends on the assigned task. When the microcomputer 48 is loading data through the One Wire UART 50, the time will be short. When the microcomputer 48 and co-processor 46 are being used to perform calculations, the time for period C will be significantly longer.

Power to the electronic module, during the One Wire communication period, is preferably supplied through a P-Channel pull-up with a series 1.5K ohm resistor. In this configuration, the One Wire UART 50 on the electronic module 10 is powered in a parasitic fashion through a diode 52 on the electronic module. The limited current capacity supplied by the 1.5K ohm resistor pull-up 54 and the voltage dropped by the diode 52 do not, however, provide the energy levels required to operate the microcomputer 48 and co-processor 46. To improve both the voltage and current, the Master One Wire Control 42 and the electronic module 10 will both enable low impedance P-Channel devices 56 to provide a direct connection to the Vcc supply in the Master 42. The two P-Channel devices 56 are enabled when the Master 42 issues either a One Wire Run or One Wire Interrupt command following the completion of a data transfer. These two low impedance series devices temporarily eliminate the ability to do data transfers, until the microcomputer 48 has completed its assigned task and both devices have returned control to the One Wire UART 50 in the electronic module 10 and the One Wire data transfer device (series 1.5K ohm resistor) in the Master 42.

When the One Wire pin of the electronic module 10 is connected to a Master One Wire device 42, the initial state and data bits sent to the One Wire UART 50 provide the parasitic power for the One Wire UART 50 on the electronic module 10. Once the initial data is loaded into the One Wire UART 50, the Master One Wire 42 device will send either a One Wire Run command or a One Wire Interrupt command to the electronic module 10 through the One Wire UART 50. Either of these commands will enable the analog circuits on the electronic module to:

1) turn on the internal P-Channel bypass for power, and
2) enable the system power controls to clear the STOP mode on the part once the internal power (Vdd) uses above the Vtrp point.

Once the STOP mode is cleared the microcomputer 48 and/or co-processor 46 will begin to operate as defined by the states assigned prior to first entering the STOP mode. During period C (FIG. 2A), the microcomputer will execute code to read and process the data in the One Wire UART 50. All One Wire data transfers on the One Wire Line 44 are suspended during this period. At a predetermined time, the microcomputer 48 and co-processor 46 will both re-enter the STOP mode and wait for the Master One Wire Control 42 to initiate a One Wire Data transfer. All data communications between the Master One Wire Control 42 and the electronic module 10 are handled on a synchronized time multiplexed basis. Due to the need for a low impedance source during the operation of the microcomputer 48 and co-processor 46, it is impossible for either the master 42 to signal the electronic module 10 using the One Wire Interface or the electronic module 10 to signal the master 42 using the One Wire Interface. In place of signaling each other, both the Master 42 and the electronic module 10 establish a time period in which no communications will be handled and full power will be applied to the electronic module 10. These times are mutually agreed on during the initial data exchange and are based on the synchronization of the True Time clock 100 in the electronic module 100 and a Real Time Clock in the Master One Wire Control unit. By synchronizing to two 32.768 Khz crystal based clocks, it is possible to guarantee that the electronic module will place the microcomputer 48 and co-processor 46 into a low power STOP mode (this mode also disables the internal bypass of the One Wire diode for internal power) before the Master One Wire Control begins the next data communication by replacing the low impedance P-Channel with the standard 1.5K ohm One Wire pull-up, which is used for subsequent data communications.

Microcomputer and Co-Processor Multiplexing:

Additional multiplexing also occurs during the operation of the microcomputer and co-processor. During this period, the microcomputer and co-processor can be run individually or together. The operating frequency of the microcomputer and the co-processor is programmable via a laser fuse on the part. In the default mode, the on-chip oscillator is used to drive both the microcomputer and the co-processor at the same clock rate. In this mode the basic clock rate is a divide by two of the on-chip oscillator. This basic clock rate is the same, independent of whether the microcomputer and co-processor run independently or together.

In a second mode (enabled by a lasering a laser fuse) the basic clock rate (a divide by two of the on-chip oscillator) is only used when running both the microcomputer and co-processor, or when running the co-processor in a stand alone mode. The clock rate is increased to equal the on-chip oscillator clock rate (remove the divide by two) when the microcomputer is operating with the co-processor disabled. The shift in frequency accommodates the frequency limits of the co-processor, while allowing the microcomputer to operate at higher speeds when the co-processor is not used. By disabling the microcomputer or co-processor as required for specific calculations, it is possible to maximize the use of energy supplied to the electronic module by the Master One Wire Power Source.

PROCESSOR ARCHITECTURAL OVERVIEW:

Referring to FIG. 1 again, the electronic module 10 is designed to provide direct software compatibility with the traditional 8052. Features on the preferred electronic module 10 include power monitoring, a One Wire UART 24, a True Time Clock 112, a CRC1 $^{16}/_{32}$ generator 110, a Math co-processor 36, a timed access protection block 34 and a three bit port 22. Expanding on these, the electronic module 10 also contains a Hi-Speed Microcomputer core 12 as well as additional features, which include two data pointers and a high speed Arithmetic Logic Unit for modulo mathematics. The core incorporates a clock based on a divide by four of the oscillator base. The electronic module also has 6K bytes of SRAM as battery backed nonvolatile memory. The 256 bytes of SFR SRAM are not battery backed and will be lost following each power-down

PROGRAM AND DATA MEMORY:

The on-chip program and data memory configuration of the electronic module/data module 10 is broken into a 32K×8 ROM for program memory (a separate 1K byte ROM for test), 256 bytes of SFR SRAM 18 and 6K×8 bytes of battery backable Data SRAM 16.

CPU CORE:

The CPU Core 12 of the electronic module preferably executes the same binary compatible instruction set as that of an 8051 microprocessor. The principle difference between the core 12 of the electronic module 10 and an 8051 is the number of clocks required to execute specific instructions. The electronic module 10 uses a divide by four of the crystal oscillator and the 8051 functions with a divide by twelve of the crystal oscillator. A machine cycle in the electronic module consists of four periods of the base oscillator. A machine cycle in an 8051 is based on twelve cycles of the oscillator.

INTERRUPT LOGIC:

The exemplary electronic module has three interrupt vectors. The microcomputer co-processor 36 can be interrupted by three different sources, which will vector the program to the respective program memory area. The three interrupts are the One Wire Slave UART, the True Time Clock Alarm and the Power Fail Interrupt. The integrated circuit is designed to allow either the One Wire Interrupt command or the One Wire Run command to remove the STOP mode and initiate program execution. Each of the three interrupts are designed to respond to specific stimulus, each of which have a well defined function in relation to the system operation.

a.) Power Fail Interrupt:

The Power Fail Interrupt is the highest level interrupt in the electronic module and is designed to signal the microcomputer (when the microcomputer is not in an IDLE or STOP mode) that the internal Vdd power has dropped below the Vpfi level (typically 2.5 to 3.0 Volts) The sole intent of this interrupt is to place the -system into a STOP mode before the internal voltage falls below the Vrst level, which in turn would force a full system Reset. If the microcomputer is running when the Power Fail Interrupt occurs, the microcomputer will vector to a routine which will place the system into a STOP mode via a software write to the PCON register. If the microcomputer is in an IDLE state and the co-processor is running, the Power Fail Interrupt will freeze the state of the co-processor by automatic setting the STOP mode. This action will not remove the microcomputer from IDLE.

b.) True Time Clock Alarm Interrupt:

The True Time Clock Alarm is the second highest interrupt and is designed to signal the microcomputer or co-processor that a previously programmed time period has expired. This time period is established to be the time that the Master One Wire has allotted to the microcomputer and co-processor to operate, before the Master One Wire will return to perform the next data transfer. If the microcomputer is running when the True Time Clock Alarm occurs, the microcomputer will vector to the assigned routine which will place the system into a STOP mode via a software write to the PCON register. If the microcomputer is in an IDLE state and the co-processor is running, the True Time Clock Alarm will freeze the state of the co-processor by automatic setting the STOP mode. This action will not clear the IDLE bit.

c.) One Wire Slave UART Interrupt Command:

The One Wire Interrupt is the third and lowest priority interrupt. This interrupt is designed to both restart the microcomputer and/or co-processor from a previous STOP mode and to also vector the microcomputer to the assigned interrupt routine. Since the One Wire Interrupt can only be issued during a One Wire Data transfer, it will not actually take place until after the microcomputer has exited the STOP mode. The purpose of this interrupt is to both wake-up the microcomputer from the STOP mode and to also force it to vector to an assigned routine. This interrupt will also remove the IDLE mode in the case where the microcomputer had placed itself into a static state during a previous operation.

d.) One Wire Slave UART Run Command (Not a true interrupt):

The One Wire Run command is not actually configured as an interrupt, but does provide the Master One Wire Control with the ability to restart the microcomputer and/or co-processor by removing the STOP mode following the completion of a One Wire Data Transfer. This command is designed to both restart the microcomputer and/or co-processor from a STOP mode and to initiate system operation at the point where the last STOP mode was set. In the case that the microcomputer was running when the last STOP was set, the microcomputer will begin execution at the next instruction. In the case where the co-processor was running, the co-processor will continue calculations at the point where it was when the STOP mode was set. In general the purpose of this command is to release the microcomputer and the co-processor to continue with the operational flow that each unit was in prior to entering the last STOP mode. This action will not, however, clear the IDLE bit.

Response to each interrupt is dependent on the current state of the system. Note that all interrupt requests are subject to the natural priority established in hardware (there is no interrupt priority SFR control on the preferred electronic module). As a result, each interrupt routine will be executed in relation to the natural priority and activity of other interrupts during the same time period. The microcomputer and co-processor have six legal states as defined by the STOP, IDLE and STM. Interrupts and One Wire Commands initiate the following responses from each of these states. All initial states with the microcomputer or co-processor operating, assume Vdd>Vtrp.

|  |  | STOP | IDLE | STM |
|---|---|---|---|---|
| 1.) | Microcomputer operating - Co-Processor disabled | 0 | 0 | 0 |
| 2.) | Microcomputer operating - Co-Processor operating | 0 | 0 | 1 |
| 3.) | Illegal State | 0 | 1 | 0 |
| 4.) | Microcomputer in IDLE mode - co-processor operating | 0 | 1i | 1 |
| 5.) | Microcomputer in STOP mode - Co-Processor disabled. | 1 | 0 | 0 |
| 6.) | Microcomputer and Co-Processor both in STOP mode. | 1 | 0 | 1 |
| 7.) | Illegal State | 1 | 1 | 0 |
| 8.) | Microcomputer in IDLE mode - Co-Processor in STOP mode. | 1 | 1 | 1 |

1.) Microcomputer operating(Vdd>Vtrp) Co-Processor disabled.
(STOP=0, IDLE=0, STM=0)
Power Fail Interrupt
Set PFI flag and immediately vector microcomputer into a routine which will place the microcomputer into a STOP mode.

True Time Clock Alarm Interrupt
Set TTCA flag and immediately vector microcomputer into a routine which will place the microcomputer into a STOP mode.
One Wire Interrupt Command
Illegal State—One Wire Commands can not be issued when the microcomputer or co-processor are operating.
One Wire Run Command
Illegal State—One Wire Commands can not be issued when the microcomputer or co-processor are operating.
2.) Microcomputer operating (Vdd>Vtrp)—Co-Processor operating. (STOP=0, IDLE=0, STM=1)
Power Fail Interrupt
Set PFI flag and immediately vector microcomputer into a routine which will place the system into a STOP mode.
True Time Clock Alarm Interrupt
Set TTCA flag and immediately vector microcomputer into a routine which will place the system into a STOP mode.
One Wire Interrupt
Command
Illegal State—One Wire Commands can not be issued when the microcomputer or co-processor are operating.
One Wire Run Command
Illegal State—One Wire Commands can not be issued when the microcomputer or co-processor are operating.
3.) Illegal State
(STOP=0, IDLE=1, STM=0)
4.) Microcomputer in IDLE mode—Co-Processor operating—(Vdd>Vtrp). (STOP=0, IDLE=1, STM=1)
Power Fail Interrupt
Automatically place the system (microcomputer and co-processor) into a STOP mode using hardware. Leave microcomputer in IDLE mode.
True Time Clock Alarm Interrupt
Set the PPTA flag. Automatically place the system (microcomputer and co-processor) into a STOP mode using hardware. Leave microcomputer in IDLE mode.
One Wire Interrupt Command
Illegal State—One Wire Commands can not be issued when the microcomputer or co-processor are operating.
One Wire Run Command
Illegal State—One Wire Commands can not be issued when the microcomputer or co-processor are operating.
5.) Microcomputer in STOP mode—Co-Processor disabled—(STOP=1, IDLE=0, STM=0)
Power Fail Interrupt
Leave microcomputer in STOP mode.
True Time Clock Alarm Interrupt
Set the PPTA flag. Leave microcomputer in STOP mode.
One Wire Interrupt Command
Remove STOP mode. Enable microcomputer operation when Vdd>Vtrp. Vector micro to respective interrupt address.
One Wire Run Command
Remove STOP mode. Enable microcomputer operation when Vdd>Vtrp. Micro will continue in-line program execution.
6.) Microcomputer and Co-Processor both in STOP mode—(STOP=1, IDLE=0, STM 1)
Power Fail Interrupt
Leave co-processor and microcomputer in STOP mode.
True Time Clock Alarm Interrupt Set the PPTA flag. Leave co-processor and microcomputer in STOP mode.
One Wire Interrupt Command
Remove STOP mode. Enable co-processor and microcomputer operation when Vdd>Vtrp. Vector microcomputer to respective interrupt address.
One Wire Run Command
Remove STOP mode. Enable co-processor and microcomputer operation when Vdd>Vtrp. Microcomputer will continue in-line program execution.

7.) Illegal State—(STOP=1, IDLE=1, STM=0)
8.) Microcomputer in IDLE mode—Co-Processor in STOP mode—(STOP=1, IDLE=1, STM=1)
Power Fail Interrupt
Leave co-processor in STOP mode. Leave microcomputer in IDLE mode.
True Time Clock Alarm Interrupt
Set the PPTA flag. Leave co-processor in STOP mode. Leave microcomputer in IDLE mode.
One Wire Interrupt Command
Remove STOP mode and IDLE mode. Enable co-processor and microcomputer operation when Vdd>Vtrp. Vector microcomputer to respective interrupt address.
One Wire Run Command
Remove STOP mode. Leave microcomputer in IDLE mode. Enable co-processor operation when Vdd>Vtrp.

SYSTEM OPERATION:

The electronic module provides three interrupt vector sources. All interrupts with the exception of the Power Fail are controlled by a series combination of individual enable control bits and a global enable through the use of the EA bit in the Interrupt Enable Register (IE). All interrupt requests are processed in hardware in direct relation to the natural priority established in hardware. This priority sets the Power Fail Interrupt as the highest, the True Time Clock Alarm Interrupt as the second highest and the One Wire Interrupt as the lowest. Interrupt enables and natural priorities are functionally similar to those of the 8051. The electronic module preferably does not have a software programmable priority SFR register.

Interrupt Operation:

Interrupts within the electronic module function as a state machine initiated LCALL instruction. When the interrupt is to be processed, a state machine within the interrupt system temporarily takes control of the ALU to force the system to vector to a predetermined address to execute the required interrupt routine. The interrupt is evaluated during the LAST-C3 cycle of the final, machine cycle of each instruction. All interrupts are evaluated during the LAST-C3 cycle of the final machine cycle of each instruction. At this time all interrupt sources, priorities, enables and potential in-progress interrupts are evaluated to determine if and which new interrupt will be allowed to be processed. To prevent the change of interrupt priorities and enables during the evaluation process, all software updates to the IE register are not used in the interrupt evaluation until the machine cycle following the write to IE. This is accomplished by latching all enables during the LAST-C3 cycle of each instruction. All data written to SFR registers is changed during the LAST-C4 cycle which follows the LAST-C3, and as such will not be made available to the interrupt logic until the following cycle. Writing to SFR registers will not delay the current interrupt evaluation and vectoring process.

Interrupt Priorities:

Interrupt priorities consist of three levels, (Low, High, and Highest). The Highest Interrupt level is reserved for the Power Fail Interrupt. The True Time Clock Alarm Interrupt is at the High level and the One Wire Interrupt is the Low level. The natural hierarchy will determine which interrupt is allowed to take precedence. The natural hierarchy is determined by analyzing potential interrupts in a sequential manner with the following preferred order: The normal Interrupt Priority register interrupts priorities (IP). The electronic module has hardwired values as listed below.

| Interrupt Source | | IP | Level | Vector Address |
|---|---|---|---|---|
| PFI | Power Fail Interrupt | NA | 0 Highest | 33 |
| TTCA | True Time Clock Alarm Interrupt | 1 | 1 High | 03 |
| OWIF | One Wire Interrupt | 0 | 2 LOW | 13 |

Interrupting Interrupts in Progress:

Interrupts in-progress with a given priority level cannot be interrupted by another interrupt with a lower priority. The High priority interrupt (TTCA) can be interrupted by the Highest priority interrupt (PFI). A Low priority interrupt in progress can be interrupted by a High priority interrupt (TTCA) or the Highest priority interrupt (PFI). As a result the system is capable of nesting up to three levels of interrupts, (Highest, High, and Low).

Simultaneous Interrupts:

Simultaneous interrupts will be evaluated in order as to the Highest, High and Low natural hierarchy. All interrupts, single or as a group, are subject first to the conditions of interrupts in-progress.

Power Fail Interrupt:

The Power Fail Interrupt (PFI), when enabled, is allowed to interrupt any other interrupt other than a previous PF1 still in-progress. No other interrupt source is allowed to interrupt a PFI while the PFI is in-progress.

Other Limitations:

All interrupts evaluated during the RETI instruction will be blocked. A new evaluation will be initiated in the following instruction. By design, the interrupt system is only allowed to initiate interrupts at the end of each instruction during the final C4 cycle, (LAST-C4) of the last machine cycle of the instruction. This allows all instructions to be fully executed without being interrupted.

TIMED ACCESS:

The timed access circuit provides system control verification to system functions which are considered vital to proper system operation. The purpose of the timed access function is to guarantee that the microcomputer is under system software control when writing to specific SFR control bits. These bits include the power on reset bit POR in the Power Fail Register, the LUL0 & LUL1 bits in the Co-Processor Control Register One and the BRAM & MXWEN bits in the MOVX Control Register. Before these bits can be altered, the microcomputer must first perform the timed access relationship. This relationship consists of writing an "AA" Hex to the "C7" Hex SFR register followed by writing a "55" Hex to the same register within three machine cycles after first writing the "AA". This timed sequence of steps will then enable any of the SFR bits protected by the timed access function to be altered during the next three machine cycles following the writing of the "55". Writing to a timed access protected bit outside of these three machine cycles will have no effect on the protected bits.

The timed access process is address, data and time dependent. A microcomputer running out of control and not executing system software will not (statistically) be able to perform this timed sequential relationship, and as such will not accidentally alter the protected bits. It is advisable that the True Time Clock and Power Fail Interrupts be temporarily disabled (CPIE=0) when using the timed access function, since the processing of an interrupt during the timed access would add time to the relationship making the relationship fail.

HARDWARE CRC:

The CRC1, CRC2, CRC3 and CRC4 registers provide the interface to a CRC shift register. All four of the CRC registers are cleared following all resets. The CRC registers, CRC1 and CRC2 can be cleared in the CRC16 mode (see PCON.2 - CRCNT) by two consecutive loads of the CRC1 register with the value read from the CRC1 register. The CRC registers CRC1–CRC4 can also be cleared in the CRC32 mode (see PCON.2 - CRCNT) by four consecutive loads of the CRC1 register with the value read from the CRC1 register. The mechanism of memory verification for either the CRC16 or the CRC32 is accomplished in the following manner. First the CRC registers are cleared and then the CRC1 register is loaded with consecutive values of memory between two fixed address locations. This is then followed by loading the CRC value of these locations (normally stored at the end of the block of memory) into the CRC1 register. If the memory content has not changed since the original CRC evaluation of the memory, the final CRC value of all of the CRC registers (CRC1 and CRC2 in a CRC16 and CRC1–CRC4 in a CRC32 mode) will return to zero values. A complete CRC32 requires a minimum of five machine cycles between writes to CRC1, before the CRC1–4 read value is correct.

HARDWARE RANDOM NUMBERS:

The selection of a random number is not supported by a true random number hardware generator, but is supported through the True Time Clock. Users can use the random power-up relationship of the product to sample and store the LSB of the True Time Clock into the data memory. As the product is cycled through a series of power-up and power-down conditions the part will be able to accumulate a large number of values which can then be translated into a large random number. Using this number the part can then proceed to use a pseudo random approach by using the co-processor's ability to process large number calculations involving exponentiation. These mathematical processes are so large there is minimal chance that the number will repeat.

POWER MONITORED OPERATION AND RESET GENERATION:

The power monitor on the electronic module monitors the presence of voltage on the internal Vdd. During the One Wire Data Transfer mode the internal Vdd is supplied via a diode from the One Wire Slave UART (OWSU) Pin. After the microcomputer is enabled and the internal power is connected directly to the Master One Wire Control Vcc, the internal Vdd is referenced against an internal bandgap reference. Whenever the internal Vdd falls below Vrst, a Reset is issued to halt program execution and place the microcomputer and co-processor into a STOP mode. Unlike standard 80C52 products, the Reset on the electronic module does not remove the microcomputer from the STOP mode, but actually places the microcomputer into the STOP mode. A Reset will, however, remove the IDLE mode and automatically place the microcomputer into the STOP mode. In addition to detecting the Vrst level, analog circuits will also automatically switch the battery backed Data SRAM from the internal Vdd supply to the Lithium battery pin when the microcomputer enters into the STOP mode. Detecting Vdd<Vrst will also disconnect the by-pass P-Channel form the OWSU pin and the internal Vdd supply. After a future Vdd power-up (Vdd>Vtrp) and software release by the One Wire Master, the microcomputer must program the BRAM bit to a "1" to reconnect the MOVX SRAM to the Vdd supply, and allow the microcomputer access to the MOVX memory.

The main system oscillator is used to clock both the microcomputer and co-processor. When the microcomputer enters into the IDLE mode, the oscillator is not disabled, in order to continue clocking the co-processor.

When the microcomputer enters into the STOP mode, however, the main system clock is disabled to stop all clocking to both the microcomputer and the co-processor. Specifics as to the system oscillator are outlined below.

STOP MODE:

The electronic module's STOP mode is designed to provide a low power state for periods when the microcomputer is in a Powered Down State or when the microcomputer is in a low power mode awaiting the conclusion of data transfers via the One Wire Slave UART. The STOP mode can only be removed when both the internal Vdd supply is above the Vtrp level and the External Master One Wire device has issued either a One Wire Interrupt command or a One Wire Run command. When the One Wire UART has issued the Interrupt or Run command to the microcomputer (following either command, all data communications must also be temporarily disabled), the microcomputer will exit the STOP mode (assuming Vdd>Vtrp). At this point the microcomputer will begin operation at either the designated interrupt vector or it will continue with the instruction which followed the setting of the STOP mode. If the microcomputer is beginning execution following an initial power-up or if the system has experienced a voltage drop below the Vrst level, the microcomputer will begin program execution from the program Reset location (0000 Hex). Execution of the Reset vector is initiated by a One Wire Slave UART Reset Command from the External Master One Wire Controller. Note that the One Wire Reset does not remove the microcomputer from the STOP mode, but does initiate an internal Reset to the microcomputer while still in the STOP mode. This variation in program vectoring is a subtle but important point. If a One Wire Interrupt is used to remove the microcomputer from the STOP mode while the part is in Reset, the microcomputer will vector to the traditional 0000 Hex program address, and will ignore the interrupt vector (Reset will clear the incoming interrupt request). If, however, the One Wire Interrupt is issued to the microcomputer while the microcomputer is not in a Reset condition, the microcomputer will vector to the 0013 Hex One Wire Interrupt vector location.

The second low power mode is termed the IDLE mode. This mode is used to stop the microcomputer in order to give the co-processor full access to all of the energy being provided through the One Wire Slave UART Pin. The IDLE mode is removed by either a signal which denotes the completion of a co-processor calculation, a True Time Clock Alarm Interrupt or by a Vrst generated Reset due to a loss of voltage on the internal Vdd. If the microcomputer is in an IDLE mode when the internal Vdd drops below the Vrst level, the microcomputer will immediately revert to the STOP mode and will then wait for a new power-up detection of the Vtrp level and a One Wire Interrupt or Run command beginning program execution.

STOP=1, or IDLE=1 will disable all circuit activity within the microcomputer. STOP=1 or a combined (STM=0 and IDLE=0) will also disable all circuit activity in the co-processor.

PORT 0:

The three port 0 pins (P0.0, P0.1, and P0.2) on the electronic module function in a similar mode (except for the Reset state) to that of an 80C52. When used as a general Port pin (OWD=0), data written to Port 0 serves to establish both the directional nature and output level of the port. When used in the standard I/O Port mode (OWD=0), the output on Port 0.0–0.3 will provide a one shot pull-up when programmed to change a previous low to a high. This is in turn followed by a weak pull-up which can be further reduced in strength when over powered and externally pulled below the TTL input low threshold. In all cases, however when programmed as a high the port will provide a minimum pull-up of at least 50 uA at 5 volts. When programmed as a low, the ports provide a continuous active pull down drive. Unlike ports on previous microcomputers PO.1 and PO.3 on the electronic module is Reset to a low state. Port bits PO.1 and PO.2 are set to a "1" when reset. PO.3 and PO.1 are also cleared to a "0" whenever the microcomputer enters into a STOP mode. Port bits PO.1 and PO.2 are not altered when the system is placed into a STOP mode.

To accommodate the direct interface to external One Wire chips, port pin P0.0 can also be programmed to use a full time P-Channel pull-up with a 4.7K series (drain to pad) resistor in place of the one shot P-Channel and the weak P-Channels discussed above. This mode is enabled through the One Wire Drive (OWD) bit at –PO.3, when programmed high. OWD=1 will disable the standard one shot and weak pull-up modes and replace the pin pull-up driver with the full time P-Channel drive with the series 4.7K ohm resistor. The pull-down state on P0.0 remains the same as in the standard mode.

These port pins have been supplied to allow the electronic module to connect directly to any of the One Wire Slave products in either a One Wire or Three Wire mode.

Figure 6A:
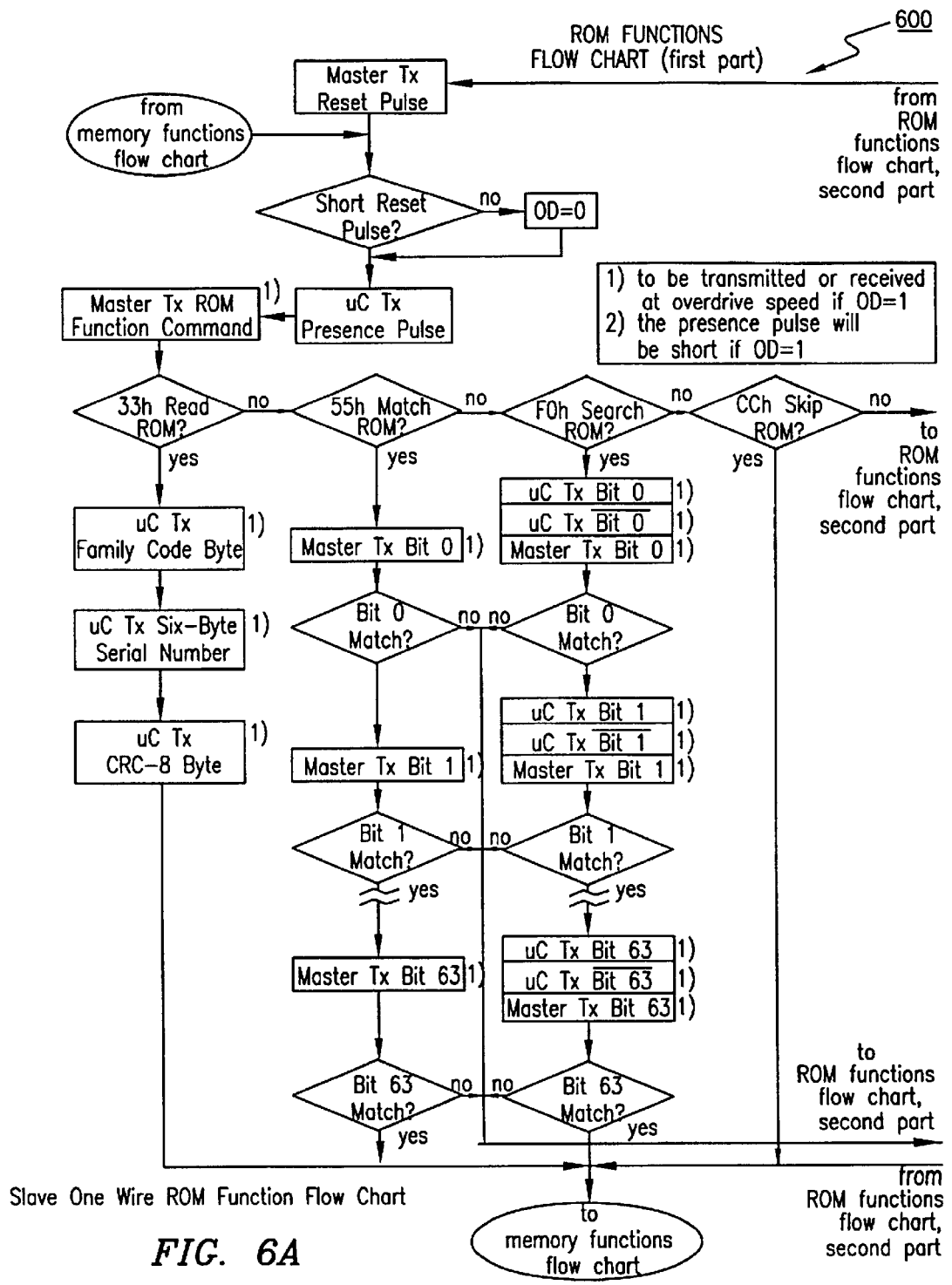
FIGS. 6A and 6B depict a flow chart indicating an exemplary operation of the one wire UART.
Figure 6B:
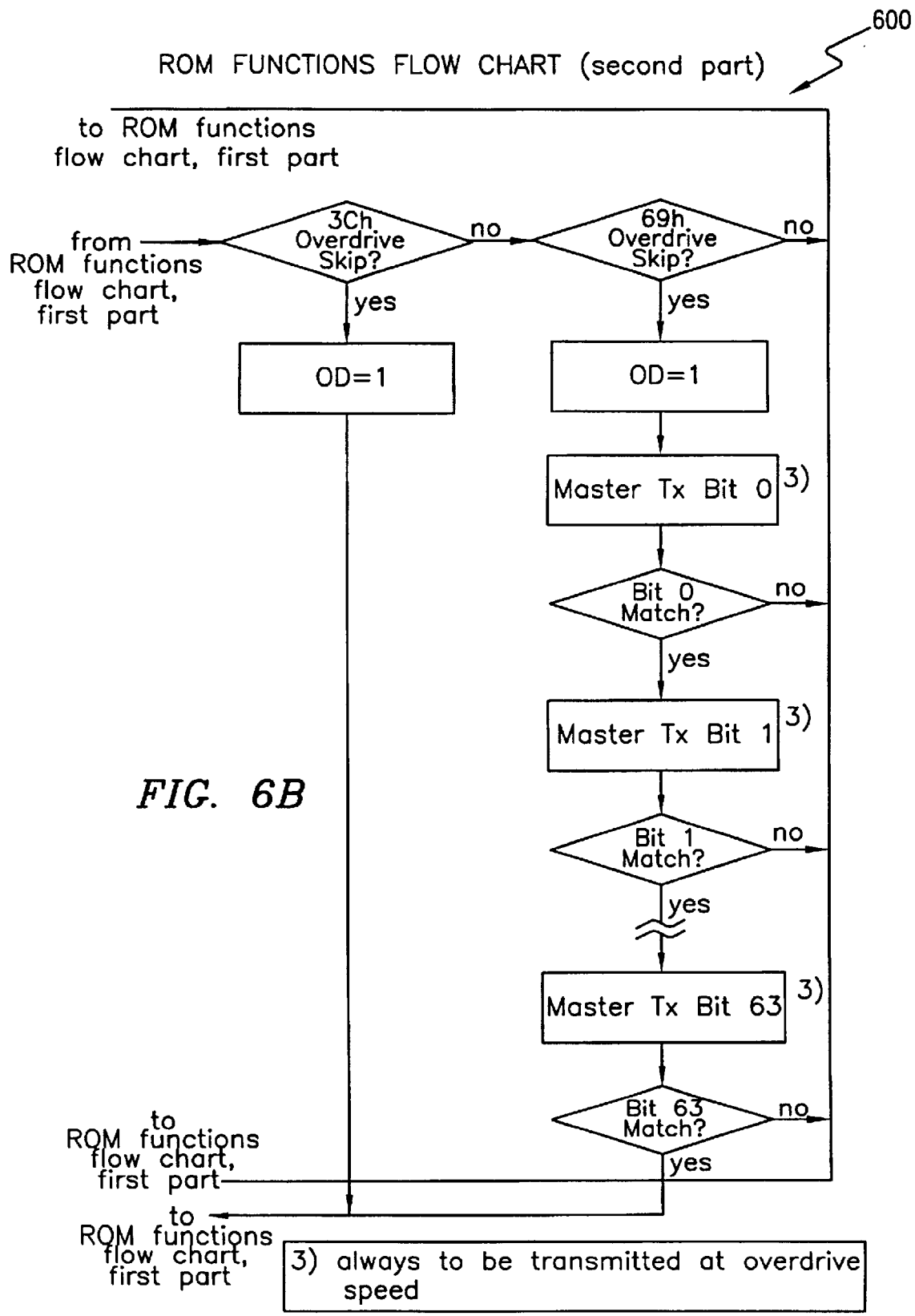
Figure 7A:
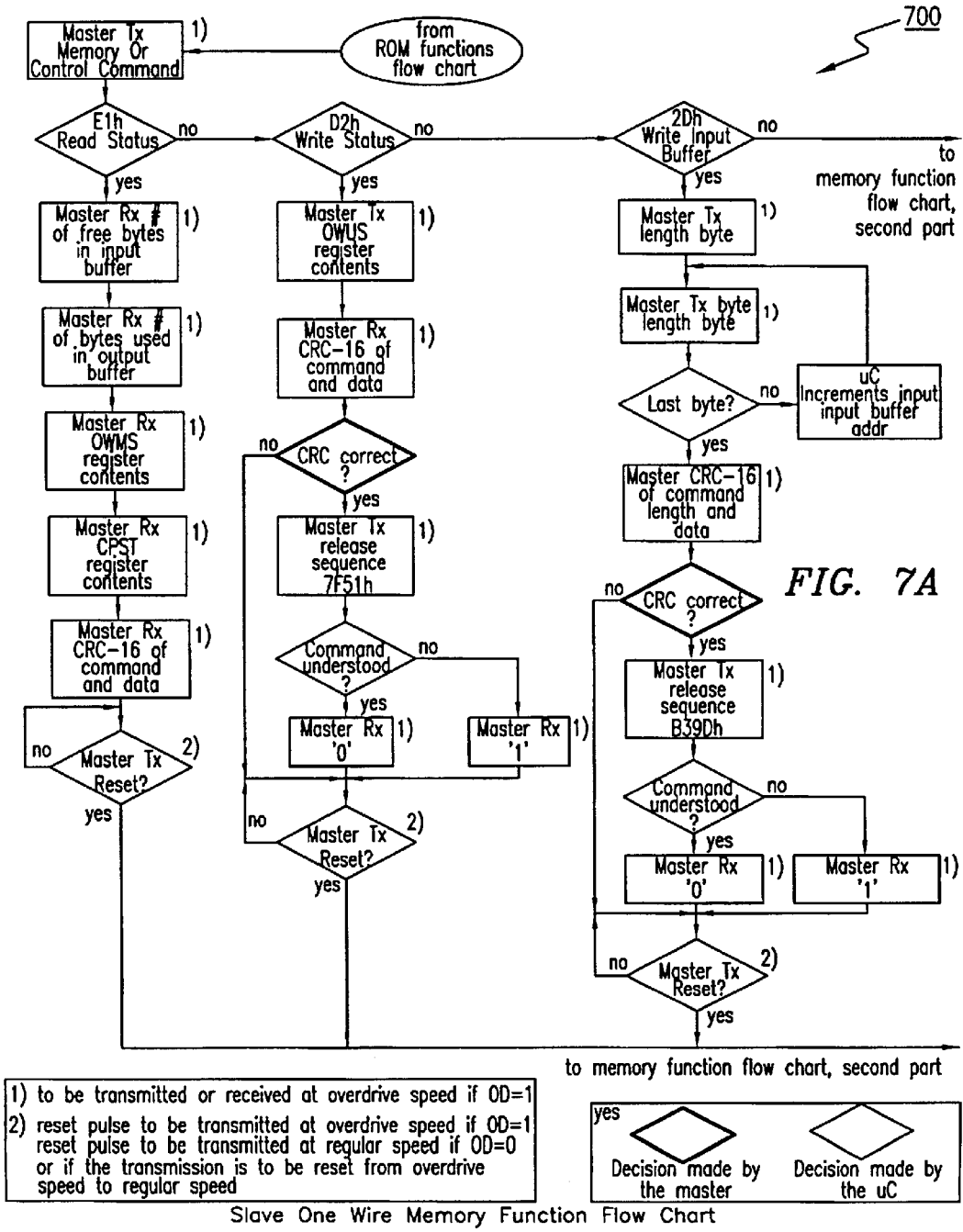
Figure 7B:
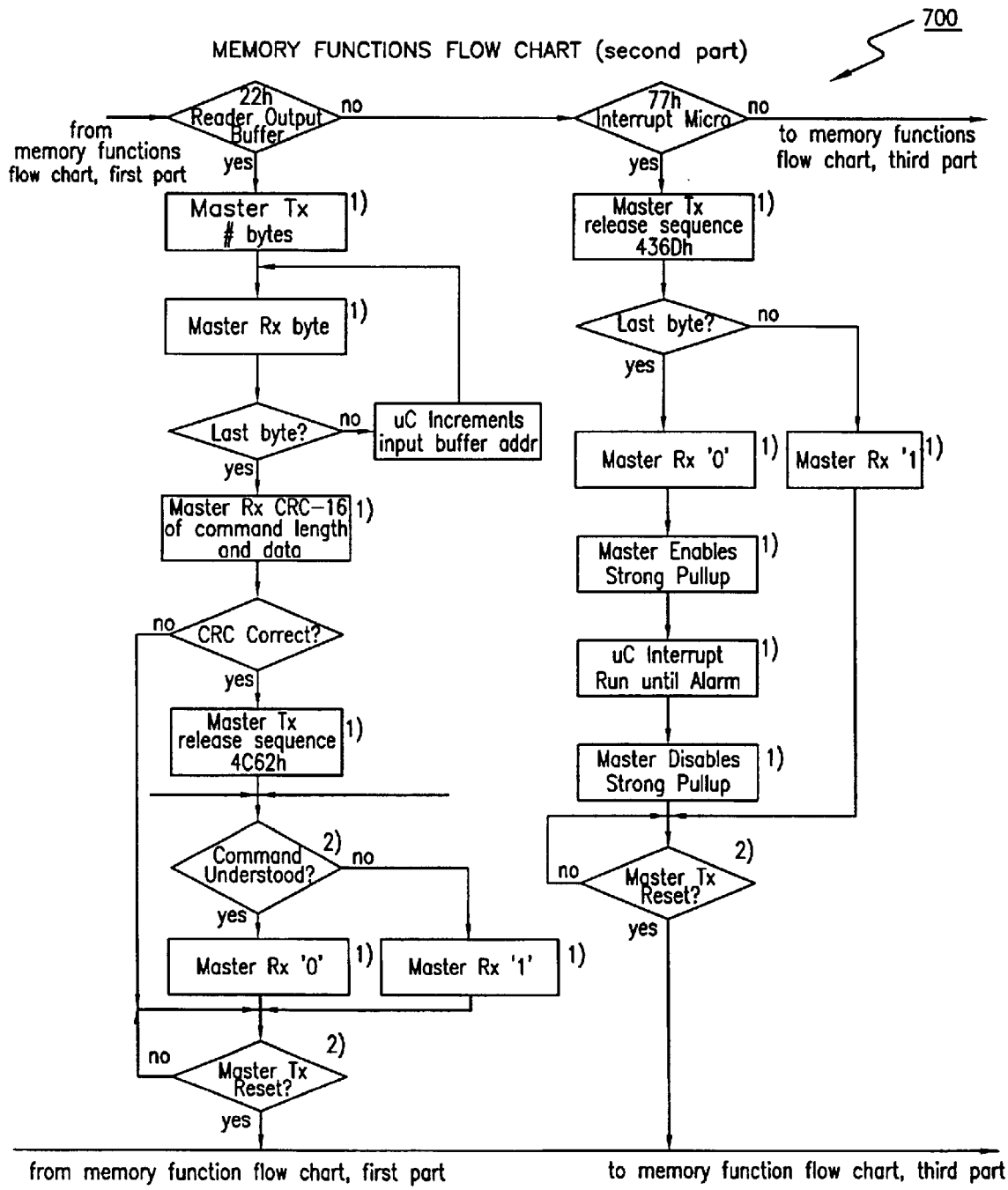
Figure 7C:
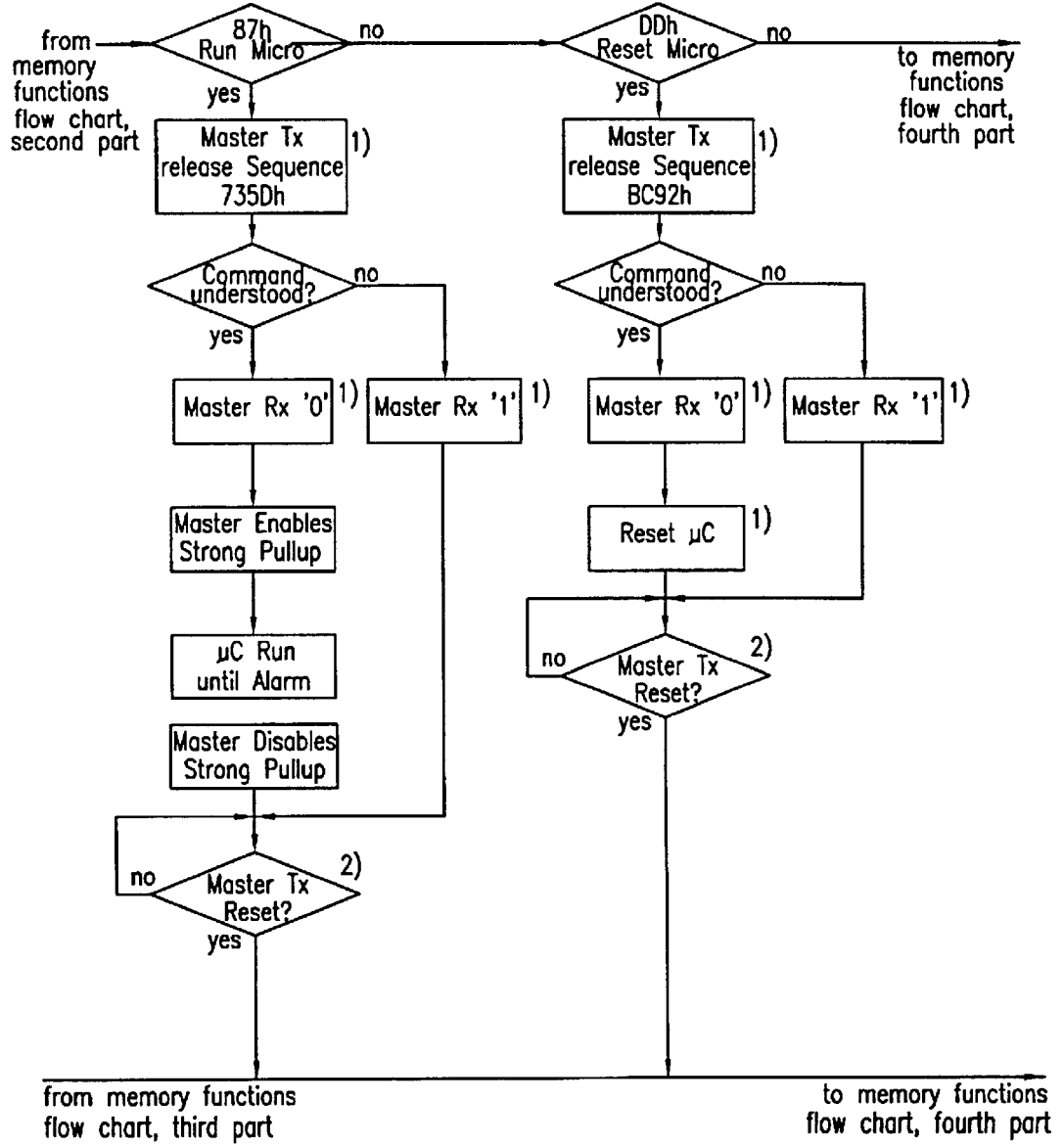

SLAVE ONE WIRE UART FUNCTIONS:

The One Wire Slave UART on the electronic module provides three functions. The first is that of a totally independent slave function which can be externally accessed at any time (other than when the microcomputer is operating) to verify the identification of the microcomputer. The One Wire front end of the UART functions to verify the serial ID number of the microcomputer. The One Wire front end is accessed via a single data line using the One Wire Protocol. The bus master must provide one of the seven ROM Function Commands, 1) Read ROM, 2) Match ROM, 3) Search ROM, 4) Alarm Search, 5) Skip ROM, 6) OD Skip, 7) OD Match. The protocol 600 required for these ROM Function Commands is described in FIG. 6A AND 6B.

The second function is that of a One Wire Serial UART which includes full bi-directional data flow as well as data flow control. The UART functions which become accessible after a ROM Function Command is successfully executed, initiate communications with the microcomputer through the use of specific One Wire commands. Commands sent by the master on the One Wire include a read of data directly from the co-processor, a write of data directly into the co-processor, a read of status registers, and a write of the One Wire UART Status SFR Register. These memory command functions are listed below:

1.) an IPR Read of the 128 byte Intermediate Product Register (IPR) in the co-processor,
2.) an IPR Write to the 128 byte Intermediate Product Register (IPR) in the co-processor,
3.) a UART Status Register read will result in the reading of four bytes which produces information in relation to:
   a.) The number of bytes free in the input circular buffer.
   b.) The number of bytes used in the output circular buffer.
   c.) The status bits associated with the One Wire Microcomputer Status Register.
   d.) The value associated with co-processor Status SFR Register.
4.) a One Wire UART Status SFR Register Write.

The protocol required for the UART memory function commands 700 is depicted in FIGS. 7A through 7D.

The single 128 byte I/O register connected to the Intermediate Product Register in the co-processor, is accessed through the use of specific One Wire ROM commands which provide a read or write to the 128 byte register. This register is always accessible during the first One Wire Data communication period following a system Reset. This register is only accessible during subsequent One Wire Data communications periods as authorized by the microcomputer programming of the specific bits in the Co-Processor Control Register SFR map.

The input circular data registers and output circular data registers incorporate 8 bytes of buffer space each. Microcomputer access to the two sets of data registers is provided through the One Wire I/O Register (OWIO). A microcomputer read of OWIO reads the head data register which also contains the oldest set of data, and a microcomputer write to OWIO writes to the data register which has been empty the longest, also termed the tail of the circular data register.

Two status registers are provided: The One Wire UART Status Register (OWUS) allows the microcomputer to establish when the input and output data registers are full, partially full or empty. Bits in this status register are outlined in the Special Function Specification. The bits include I/O full and empty flags as well as four general-purpose flags which can be written by the One Wire master to provide information to the microcomputer during serial- port communications.

The One Wire Micro Status Register (OWMS) allows the master on the One Wire interface to read information on the status of the microcomputer. The two most significant bits in the OWMS register provide the status as to the One Wire accessibility to the 128 byte Intermediate Product Register (IPR) in the co-processor as well as the status of the POR bit in the PFR SFR register in the microcomputer. This register also includes six general-purpose flags which can be written by the microcomputer to supply information to the One Wire master during serial-port communications.

The One Wire Serial UART allows the master to directly load or unload data from the intermediate product register of the co-processor. This transfer of data must always first be authorized by the microcomputer software (except for One Wire communications following a Reset). Once the microcomputer has given control of loading and/or unloading of the co-processor to the UART, entire blocks of up to 1024-bits can be loaded or unloaded using special commands issued to the UART.

Reading and Writing the Status Registers

The One Wire Read UART Status command provides the One Wire Master with the number of open input data registers, the number of used output buffer registers and the register content of the OWMS register. The UART returns the available input buffer space, the number of bytes which are ready in the output buffer, the contents of the OWMS register, and the contents of the Co-Processor Status Register.

The One Wire Write Status command allows the One Wire Master Controller to write the four general-purpose flags of the OWUS register, to communicate with the microcomputer.

Reading and Writing Data

The One Wire Write Input Buffer command will initiate a hardware write to the Input Data Registers. The packet is composed of a byte which indicates how many bytes are to be transferred to the input buffer, followed by the actual data bytes. The data however will not be copied into the input buffer until the master issues a Release Sequence. This allows the master to verify the transferred data before releasing it to the microcomputer.

The Read Output Buffer command will be followed by a read of as many bytes from the Output Data Registers as have been defined by the master's length byte. The bytes however are not removed from the output queue until the master issues a Release Sequence. This allows the master to verify the integrity of the data before clearing the output buffer.

The Write Intermediate Product Register (IPR) command will initiate the loading of 128 bytes from the master, directly into the co-processor. This operation is only possible during the first One Wire communication following a system Reset, or whenever the microcomputer permits access to the Intermediate Product Register, as defined by the IOST bit in the One Wire Microcomputer Status SFR Register, (also viewable by the One Wire Master through the Read UART Status command which will provide data as to the contents in the One Wire Microcomputer Status Register).

Run Command

The One Wire Run command will clear the STOP mode in the system and will initiate operation (microcomputer and/or co-processor) at the location following the original setting of the STOP mode. The Run command will not clear the IDLE mode, but will clear the STOP mode. If the microcomputer was running prior to the STOP, it will continue to run with the instruction following the Run command. If the microcomputer was in an IDLE prior to the setting of the STOP mode, the microcomputer will remain in a static IDLE mode. In a similar fashion if the co-processor was running prior to the STOP, it will continue after removal of the STOP. If the co-processor was disabled prior to the STOP, it will be disabled after the removal of the STOP. If the Run command is issued to the system while the microcomputer is in a Reset, the microcomputer will begin execution at the 0000 Hex address.

Interrupt Command

The One Wire Interrupt command will issue an interrupt to the microcomputer to bring the microcomputer out of either the IDLE or STOP mode, to begin data computations. The One Wire Interrupt command will normally vector the microcomputer to the 0013 Hex address, but will be changed to the 0000 Hex Reset Vector if a Reset state is present when the One Wire Interrupt command is issued.

One Wire Reset Protocol Pulse

The One Wire Protocol requires that a Reset Pulse be initiated on the One Wire, before commands or data can be sent. The Reset Pulse provides a clear starting condition by initializing the UART controller. The contents of the Data Registers and of the OWIO, OWUS, and OWMS registers, however, are not affected by a One Wire Reset. Furthermore, the One Wire Reset does not reset the microcomputer.

One Wire Microcomputer Reset Command

The Reset Microcomputer command does reset the microcomputer via the One Wire UART. The Data Registers will be cleared and the OWIO and OWMS registers will be set to their initial values. The general purpose bits of the OWUS register, however, are all set to "1" instead of reset to "0" as when a power-up reset has occurred. This allows the microcomputer to read the OWUS register after a reset and understand that the previous microcomputer reset came from a command delivered through the One Wire UART.

ON-CHIP BATTERY BACKABLE DATA SRAM:

The 6K bytes of Data SRAM on the electronic module are divided into a 5.5K byte block (0200 Hex to 17FF Hex) and a 512 byte block (0000 Hex to 01FF Hex). Both blocks are disabled during the battery backed state controlled by the BRAM bit in the MOVX Control SFR Register (MXCNT). BRAM must be set to a "1" before any of the on-chip MOVX SRAM can be read or written to by the microcomputer. Once the BRAM bit is set, all 6K bytes of the MOVX memory can be read by the microcomputer. In addition, the lower 512 bytes of the MOVX memory is also alterable. The upper 5.5K bytes, however, can not be written until the MXWEN bit, also in the MXCNT register, is set to a "1". Both the BRAM and MXWEN bit require the use of a timed access write. When both bits are set, the microcomputer has unlimited read and write access to the 6K bytes of MOVX memory. The Data memory will always be connected to the Lithium Battery Backup pin whenever the internal Vdd falls below the Vrst level or whenever the system enters into either the IDLE or STOP mode. Data in the data memory is automatically cleared whenever the system detects that the True Time Clock is stopped externally by altering the crystal functionality, or in the event that the microcomputer detects a condition that would signal the software to destroy the MOVX SRAM via the DSM bit in the SDR SFR register.

OSCILLATORS:

The electronic module is configured to operate with three separate oscillators. These include the One Wire Slave UART oscillator for One Wire Communications, a 32.768 Khz crystal oscillator for the True Time Clock, and an on-board system oscillator for the microcomputer and co-processor. Three independent oscillators are used to meet the specific needs of each function and the associated system constraints.

1.) The True Time Clock crystal oscillator supplies a highly accurate, low power clock source to the True Time Clock.
2.) The One Wire Slave UART requires a fixed frequency, on-chip oscillator in order to meet established One Wire Communication Standards.
3.) The microcomputer/co-processor system oscillator is designed as a higher frequency clock source.

The microcomputer/co-processor oscillator is designed to run at either one or two different frequencies (laser option). In the default configuration, the frequency to the microcomputer and co-processor will be the same, independent of which processor is running. When selected through a laser option the base frequency of the microcomputer working alone (co-processor disabled) is automatically set to provide the highest frequency. In the lasered option the combined operation of the microcomputer/co-processor requires that the oscillator frequency be reduced by a factor of two when running both the microcomputer and co-processor, or when running the co-processor in a stand alone mode. The shift in frequency accommodates the frequency limits of the co-processor, while allowing the microcomputer to operate at higher speeds when the co-processor is not used. By disabling the microcomputer or co-processor as required for specific calculations, it is possible to maximize the use of energy supplied to the electronic module by the Master One Wire Power Source.

In the case of the microcomputer and co-processor, the system clock is initialized following a Reset to a high frequency mode. Note this oscillator will not begin operation until the system detects a voltage level above the Vtrp level combined with either a One Wire Run or Interrupt command. The microcomputer/co-processor oscillator is automatically disabled during a STOP or a Reset.

CO-PROCESSOR:

The co-processor on the electronic module is designed to directly support modular arithmetic. The co-processor has been designed to operate while the microcomputer and One Wire Slave UART are held in a static low power state. This system operation allows the co-processor to provide the best performance in relation to the limited current provided to the electronic module when the product is connected to an external Master One Wire Source. Under standard operating mode the co-processor is loaded in either a direct or indirect fashion. The direct load is accomplished through a special One Wire Slave UART command. In the direct mode, the input data from the One Wire Slave UART is copied directly into the Co-Processor Intermediate Product Register. The indirect mode is achieved when the microcomputer is used to load data into the Intermediate Product Register through the use of a SFR Co-Processor Intermediate Product Register. Unloading the co-processor product is also supported by both the direct interface to the One Wire UART as well as the microcomputer SFR register. To ensure security, all loading and unloading of the co-processor via the One Wire UART is only authorized by the microcomputer through the setting of bits in the Co-Processor Control Register. The standard default settings in the Co-processor Control Register will disable all One Wire communications to the co-processor. The following areas describe the basic concepts behind the design and use of the co-processor.

Modular Exponentiation

Public-key crypto-systems that are based on modular arithmetic are considered as secure mechanisms for a number of cryptographic applications. The underlying algorithms make use of so-called trap-door functions. Exponentiation in finite fields ("modular exponentiation"), for example, can be performed very quickly compared to the inverse function of computing logarithms.

Currently the most effective algorithm for computing exponentiation of large numbers consists of a series of square and multiply operations. The algorithm for computing $a^e$ mod n for operands of word length N can be described as follows:

modexp (a,e,n,N);
b=1;
for (i=N-1) to 0 do
  b=b*b mod n;
  if (i-th bit of e=1) then
  b=a*b mod n;

A complete exponentiation of a 1024-bit number is performed doing 1024+512=1536 square and multiply operations if a binary modulus e composed of 512 zeros and 512 ones is assumed ("Hamming weight" h=0.5).

The Modular Multiplication Unit

The Algorithm

One of the most suited algorithms concerning a hardware implementation is known as Brickell's algorithm. In its full expanded version, i.e. using an N-bit data path, it is able to compute one modular multiplication in N+11 clock cycles, if a true single phase clock is assumed.

The algorithm used for this block is slightly different than the original version. First, it does not make use of delayed carry number representation, and second, it uses only eight extra bits so that in theory it could be able to calculate one modular multiplication in N+8 clock cycles. The essential part of the algorithm is the computation of the partial product P(i+1) by means of addition of the former partial product, the multiplicand b, and the subtraction of the shifted modulus n:

$$P(i+1)=2*(P(ip)+a(i)*b-k*n)$$

The decision whether n shall be subtracted is taken as follows: If the four most significant bits of the partial product are larger than the three most significant bits of the modulus, then k=128. Else if the four most significant bits of the partial product are larger than the two most significant bits of the modulus, then k=64. In any other case, k=0 and therefore no subtraction will be required. It can be shown that if the partial product is computed N+7 times the 1024 most significant bits of P contain the correct result of the modular multiplication P=a*b mod n.

Hardware Architecture of the Coprocessor

Bearing this algorithm in mind, the basic building blocks of a modular multiplication unit are straightforward. Four long-word registers are used for storing the operands and the intermediate product. The only additional major block is a 3-operand long-word adder 120. The control logic consists mainly of circuitry for loading and shifting the operands, and of logic for the decisions whether b shall be added and/or n shall be subtracted. The basic hardware architecture for the co-processor 36 is shown in FIG. 3.

The co-processor circuit 36 will be able to compute a 1024-bit RSA encryption in 1536 * 1031=1,583,616 clock cycles on average. If we assume a single phase clock running at 2.0 MHZ and flip-flops for storing the intermediate product, we end up with a computation time of T=800 ms including writing and reading the operands and the result, respectively.

In order to keep the chip area in a reasonable size as well as to reduce the cycle time, the addition is performed in a multiplexed fashion. In other words, a 264-bit three-input adder 120 is used instead of a full 1024-bit three-input adder for computing the intermediate product which is placed in the intermediate product register 122. Furthermore, the microcomputer's clocking scheme (using C-terms) makes it possible to store the result using latches instead of flip-flops. There is a (potential) trade off between an increase of computation delay of a factor of four and additional multiplexing logic. The time for RSA encryption adds up to 1536 * 1031 * 4=6,334,464 clock cycles on average resulting in T=3.17 sec for 1024-bit RSA encryption at 2 MHZ.

The CPCTO register is designed to control the three primary operational states of the co-processor 36. These include (1) loading and unloading, (2) shifting and storing the modulus, multiplier, multiplicand, and exponent, and (3) performing the required calculation. Values for the modulo, multiplier, multiplicand and exponent are individually loaded (1) into the co-processor through the "P" product register 122. Following the load of the modulus "n" into the "P" product register, a shift and store process (2) is used to simultaneously transfer the contents of the "P" product register into the modulus register 124 while also shifting the data until a "1" is in the most significant bit of the 1024-bit modulus register 124. Shifting of the modulus establishes both the magnitude of the calculation, as well as the number of shifts required during the loading, shifting and storing of the multiplier and multiplier values, following the individual loading of each through the "P" Product Register 122. After all of the data (modulus, multiplier, multiplicand and exponent) has been entered, shifted and stored, the co-processor 36 is then enabled (3) to perform one of four types of calculations. Following the completion of the multiplication process, the results will be placed automatically into the "P" Product Register 122. The results can then be retrieved through the unloading process (1) of the "P" Product Register 122. Each of the three steps (1, 2, and 3) outlined above is controlled through the programming of CPF0 and CPF1.

A Co-Processor Status SFR Register 126 (CPST) is also provided to allow either the microcomputer or the external One Wire Master to determine how far an exponential calculation has progressed. The CPST register 126 provides an 8-bit binary value as to the status of the current co-processor operation. The lsb (CPST.0) indicates when the co-processor 36 has completed a given operation. During exponential calculations, the remaining seven bits CPST.7–CPST.1 will provide a level of completion of long calculations.

CPST.7–CPST.1 correspond to the seven most significant bits of the exponentiation counter 128. Consider a 1024-bit exponentiation as an example. The exponentiation counter starts at the value 400 Hex. After having processed the corresponding bit of the exponent, the counter is decremented by one. (Note that the processing of one single exponentiation bit includes one square operation and, in the case where the exponentiation bit is "1", one multiplication.) The calculation will be completed when the exponentiation counter will have reached the value 00 Hex. The calculation can be monitored by means of the CPST register 126 as follows:

| exp counter value | CPST.7 - CPST.1 | CPST.0 (completion) | CPST value |
| --- | --- | --- | --- |
| 400 | 40 | 1 | 81 |
| 3FF | 3F | 1 | 7F |
| 3FE | 3F | 1 | 7F |
| — | — | — | — |
| 3F0 | 3F | 1 | 7F |
| 3EF | 3E | 1 | 7D |
| — | — | — | — |
| 010 | 01 | 1 | 03 |
| 00F | 00 | 1 | 01 |
| — | — | — | — |
| 001 | 00 | 1 | 01 |
| 000 | 00 | 0 | 00 |

Co-Processor Performance

The time the co-processor needs to perform one n-bit RSA encryption is computed in a first-order approach as follows:

$$t(RSA-n)=(n+k)*mux*(1+h)*n*1/f (clk),$$

where n, k, mux and h are defined as follows:

n: Number of bits of the modulus.

k: Constant inherent to the hardware architecture—k=16 is a good first-order approximation.

mux: Multiplexing factor. mux=4, because our architecture is based on a 256-bit data path.

h: Hamming weight of the exponent, i.e., number of bits of the exponent which are equal to one. The average case is h=0.5, whereas the worst case would be h=1.0.

f(clk): Clock frequency of the oscillator.

In the following, some values have been computed (by hand, a spread-sheet program would be more appropriate):

| Encryption type | f (clk) = 1.0 MHz | f (clk) = 10 MHz |
| --- | --- | --- |
| 256-bit, h = 0.5 | 418 msec | 41.8 msec |
| 256-bit, h = 1.0 | 557 msec | 55.7 msec |

-continued

| Encryption type | f (clk) = 1.0 MHz | f (clk) = 10 MHz |
| --- | --- | --- |
| 512-bit, h = 0.5 | 1.62 sec | 162 msec |
| 512-bit, h = 1.0 | 2.16 sec | 216 msec |
| 1024-bit, h = 0.5 | 6.39 sec | 639 msec |
| 1024-bit, h = 1.0 | 8.52 sec | 852 |

Initial HSPICE simulations indicate that the oscillator will run at 6.7 MHZ (at 3.0 V, 85 degC, worst-case process) and up to 18 MHZ (at 5.0 V, 25 degC, typical process) if all the required supply current is available during the whole computation time.

True Time Clock

The electronic module 10 incorporates an on-board True Time Clock (see FIG. 1 and FIG. 5) and Alarm function. The clock preferably consists of a 32.786 Khz oscillator 102 followed by a 47-bit binary counter. The byte wide registers are grouped into two groups, subseconds and seconds. Each of these registers are addressed through the use of an address index register (TTCIR) and data is then accessed through a read/write data register (TTCDR). Each read or write of TTCDR will automatically increment the TTCIR index register. The True Time Clock 100 is not programmable, but is designed to start from an all zero point when enabled during the manufacturing of the product (test). Offsets for specific time can be stored in the data memory area to create any specific time relationship required. Once either of the programmable fuses of the SL bit has been set, and the system is powered-down, all future ability to enter the test mode is disabled, and all future writes to the True Time Clock control and calibration will be disabled.

In addition to the true time registers, there are four True Time Alarm related registers. The first two registers are termed the Reload Registers 108, 110 and provide 8-bits for a subsecond value and 8-bits for a seconds value to supply a reload count-down value for a future True Time Alarm Interval. The Reload Register values are automatically loaded into the Seconds or Sub-seconds Alarm counters 112, 106 by the setting of the TTAR bit in the PCON SFR register. The Seconds or Sub-seconds Alarm counters 112, 106 are also automatically reloaded with the contents of the respective Reload Registers whenever the system receives either a One Wire Run or One Wire Interrupt command. Once the Alarm Counter Registers have counted down to zero an alarm signal will be issued to the interrupt circuits on the microcomputer. At this time the Alarm Counters will stop counting until a future reload is initiated by either a microcomputer write to the PCON register or a reload by either a One Wire Run or One Wire Interrupt command.

The alarm is used to establish an interrupt to the system to indicate that the microcomputer and co-processor are directed to enter into a STOP mode and wait for the Master One Wire Control to begin One Wire communications with the One Wire UART. Once the communications have been completed, the Master One Wire Control will issue either a One Wire Run command or a One Wire Interrupt to restart the microcomputer and/or co-processor. The Reload values are determined by either the system software or by a value established during the first communications between the microcomputer and the Master One Wire Control.

Security, Testability and Re-programmability:

Overview

The security of the electronic module is typically in direct conflict with the testability, and re-programmability of the product. The concept of being able to fully test a part obviously requires the ability to view all areas of the product. Re-programmability also revolves around the ability to alter and verify the alteration of programmable relationships when altering the functionality of the part or the data associated with the associated program. In each of these cases, however, these capabilities can appear as back doors into the product and as such limit the security of the part. To provide a combined relationship of security, testability and re-programmability, the electronic module incorporates a variety of physical and digital locks to support the manufacture and test of the part while insuring the overall security of the product.

Testability

In the case of testability, the electronic module has been designed to support an external high speed interface for use at wafer level probe tests. To remove this feature (following the probe test), the wafers are lasered to disable circuits associated with the external high speed interface. The high speed interface pads are then covered with a nitride coating as well as a final covering of additional metal layers used in a flip chip solder process. From a One Wire Test perspective, future use of the test mode is totally disabled by programming two fusible links during the final test sequence. All future test access is disabled following the programming of these fuses.

Re-programmability

Re-programmability in the electronic module comes in the form of two distinct areas. The first area is that of user re-programmability and comes in the form of loading and altering Data SRAM as required by the application code. The second area of programmability is associated with the setting of control functions associated with the performance of the part. These include the True Time crystal oscillator trim bits and other similar compensation relationships. Both of these areas have the potential danger of being altered by applying a negative voltage to the product. Although this is unlikely to occur as a result of general use, the possibility that the negative voltage is used by someone to attempt to alter the part to their advantage is a distinct possibility.

As a result, the electronic module has been designed to enter into one of two modes following the application of negative voltage to the part. In both modes, the application of negative voltage will cause the One Wire Diode 52 and N-Channel driver 56 to draw current from the Vss pin located next to the OWSU pin 44 (See FIG. 2). As the reverse voltage is increased, the current through the substrate (connected to Vss) will increase substantially. As the substrate current increases, additional current will be pulled from substrate areas further from the pin, until current is being pulled from areas close to battery backed Data SRAM and or True Time Clock functions. The current will also begin to effect the crystal oscillator and in turn reduce the oscillator gain and ultimately alter the True Time Clock time. Although it is impossible to stop this effect, it is possible to detect this relationship and take action in relation to it. A sensitive sacrificial latch is located close to the OWSU pin. This latch is, by design, set to change state when it detects a reasonable level of substrate current flow. When the latch toggles from its pre-programmed state, a signal is issued to clear the OSCENA bit in the True Time Control register (TTCNT). This in turn will clear both the time in the True Time Clock registers as well as all of the 6K bytes of Data SRAM. At this point the electronic module is designed to allow either one of two modes of operation, as outlined below. Each mode is determined by a mask programmed ROM bit termed the Scorched Earth Policy bit (SEP).

Re-initialize Policy

When the SEP bit is programmed to a low state ("0"), SEP will allow re-initialization. After removing the negative voltage and normal power is re-applied, a command sequence is issued to the product which will initialize the True Time Clock oscillator by writing a "1" to the OSCENA bit in the True Time Control register (TTCNT). This bit can not be cleared by software (outside of a test mode), but it can be set to a "1" to restart the previously disabled crystal oscillator. Once the crystal oscillator is enabled, the forced clearing function to the Data SRAM is released. At this point new data can be stored as per the application relationship associated with the re-initialization policy.

Scorched Earth Policy

In the second mode the SEP bit is programmed to a high state ("1"). In this state the electronic module will disable the write capability to the True Time Control register (TTCNT) after test, and will not allow the crystal oscillator to be restarted. This in turn enables a clearing signal to constantly clear the Data SRAM, making it impossible to store or retrieve any data from the MOVX Data Memory. This in effect permanently disables the device, making it incapable of being used again.

SPECIAL FUNCTION REGISTER BIT DESCRIPTIONS (SFR)

One Wire Operation:

Port P0.0 is programmable via the OWD bit to provide the proper combination of series resistance (4.7K ohms) and pull-up drive capability to handle the One Wire communication interface to additional external One Wire devices. The STOP mode will automatically clear P0.0 to a "0" to eliminate any potential current loading of any One Wire device connected to P0.0. This prevents additional loading on the system during the period that the external One Wire Master is communicating with the One Wire UART on the electronic module.

STOP Mode Control:

The STOP mode on the electronic module is not set or cleared in the same manner as the STOP mode found on other Hi-Speed microcomputers. When set, however, the STOP mode on the electronic module does terminate program execution and stop all of the clocking inside the microcomputer (including the co-processor). The primary difference in the electronic module's STOP mode is in how it is set and cleared. Note that the One Wire Reset, Power-Fail Reset, Power-Fail Interrupt and True Time clock interrupt do not clear the STOP mode on the electronic module. As seen below, the STOP is set whenever the internal supply drops below the Vrst level. The POR signal at Power-up will also set the STOP mode. The STOP mode disables all clocks to the microcomputer and to the co-processor.

Setting the STOP mode:

1.) The STOP mode bit can be set to a "1" in the microprocessor software at anytime.
2.) The STOP bit is also automatically set by hardware whenever the IDLE mode is enabled (IDLE=1), and one of two specific conditions occur. Conditions which will initiate the hardware STOP mode when the microprocessor is disabled (IDLE=1) are:
   a.) The detection of the internal Vdd supply failing below the Vpfi level with IDLE=1. Vdd=Internal supply voltage used to operate microprocessor and co-processor. Vpfi=Power Fail Interrupt Voltage level (typically=3.0 to 2.5 Volts).
   b.) The second condition is whenever a True Time Clock alarm occurs with IDLE=1.

Either of these conditions will automatically place both the microprocessor and co-processor into a STOP mode.

Note that the IDLE bit will remain set to a "1" when STOP is set by either of these relationships.

3.) The STOP bit and Reset state are both automatically set by hardware when Vdd<Vrst. This relationship will only occur in the event that the system can not react in time to a fast powerdown. This would only take place when the internal Vdd is shorted to ground, prior to the disabling of the internal bypass P-Channel.

Clearing the STOP mode:

The STOP mode can only be removed by either,

1.) A One Wire Interrupt Command accompanied by the detection of Vdd>Vtrp. Vdd=Internal supply voltage used to operate microprocessor and co-processor. Vtrp=Restart Operation Voltage Trip Point level (typically=4.0 to 3.5 Volts).

2.) A One Wire Run Command accompanied by the detection of Vdd>Vtrp.

3.) When Vdd>Vtrp, if the True Time Clock Alarm (TTCA) Interrupt has not occurred prior to the Vtrp level being detected. If the TTCA interrupt signal is issued prior to Vdd rising above the Vtrp level, the system will remain in the STOP mode until it is released by a One Wire Run or One Wire Interrupt command.

IDLE:

Processor STOP/Co-Processor Run Mode Control:

When the IDLE bit is set to a "1" the system will terminate program execution and place the microcomputer into a static low power state to maximize power to the co-processor. Setting this bit ("1") will also start the co-processor and initiate execution of the modulo multiplication in the same manner as the STM bit in the CPCT2 register. The STM bit in the CPCT2 register does not stop the microcomputer, and is used when both the microcomputer and the co-processor are to operate in parallel. Note that a read of the STM bit actually provides a status indicator to determine if the Co-Processor has completed a current calculation. As a result, setting the IDLE bit will also automatically force the STM bit in the CPCT2 register to be set to a "1". The IDLE bit is designed to channel all of the available current supplied by the OWSU pin to the multiplication process. If a total loss of power (Vdd<Vrst) is detected prior to the completion of the multiplication, the IDLE bit will be cleared by the Power Fail Reset and the IDLE mode will revert to the STOP mode.

Setting the IDLE mode:

1.) The IDLE mode bit can only be set to a "1" by microprocessor software.

Clearing the IDLE mode:

The IDLE mode can only be removed by one of the following relationships:

1.) A One Wire Interrupt Command accompanied by the detection of Vdd>Vtrp. Vdd=Internal supply voltage used to operate microprocessor and co-processor. Vtrp=Restart Operation Voltage Trip Point level (typically=4.0 to 3.5 Volts).

2.) A One Wire Reset Command independent of Vdd.

3.) A Power Fail Reset (Vdd<Vrst).

4.) The completion of the last calculation assigned to the co-processor, will result in a clearing of the STM bit in the Co-Processor Control Register Two SFR. The clearing of STM by the co-processor will also automatically clear the IDLE bit, if set.

CO-PROCESSOR CONTROL REGISTER ZERO

The co-processor comprises registers for controlling:
1. Load/unload the Intermediate Product Register,
2. Shift and store the Intermediate Product Register to the modulus, multiplier, multiplicand or exponential registers, or
3. Select the mode of co-processor operation.

CO-PROCESSOR "P" INTERMEDIATE PRODUCT REGISTER (CPP;A4 Hex)

The CPP register provides an 8-bit I/O parallel port for loading and unloading the 1024-bit Intermediate Product Register "P" associated with the co-processor.

Loading Intermediate Product Register ("P") through the CPP.

Data written to the CPP register is loaded directly into the co-processor Intermediate Product Register "P". Each byte written to the CPP will be serially shifted (Msb→Lsb) into the co-processor 1024-bit Intermediate Product Register "P". The serial shift of the data from the CPP register requires four machine cycles of the microcomputer to complete the serial shift of the 8-bits into the Intermediate Product Register. 128 microcomputer writes to CPP will fully load the 1024-bit register. Data in the register prior to a write will be lost (Lsb first) as new data is shifted from the Msb toward the Lsb. Once the Intermediate Product Register is loaded, the contents of register can then be transferred to either the modulus, multiplier, multiplicand or exponential register using the SHS0 and SHS1 controls bits in the CPCT1 SFR register.

Unloading Intermediate Product Register ("P") through the CPP.

Following each read of CPP, new data (8-bits) is serially shifted (Lsb→Msb) out of the co-processor 1024-bit Intermediate Product Register "P" and into the CPP register. The serial shift of the 8-bit data from the Intermediate Product Register "P" into the CPP register requires four machine cycles of the microcomputer. 128 microcomputer reads of CPP will fully unload the 1024-bit Intermediate Product Register "P". The first byte read from CPP following the completion of the multiplication will be the Msb of the result. The numerical base size of the result can be determined by reading the modulus size register, MSR.

MODULUS SIZE REGISTER (MSR;A5 Hex)

The MSR register provides an 8-bit binary value of how many bytes were loaded and stored in the "n" modulus register. Each transfer of the Intermediate Product Register to the "n" modulus register will automatically also transfer the contents of the IPSR to the MSR. As a result this number indicates the numerical base (number of bytes) used by the modulus and resulting co-processor product. As an example a 80 Hex value in MSR (128 bytes×8-bits per byte=1024-bits) indicates that the number base used in the co-processor calculations is based on a 1024-bit binary number.

INTERMEDIATE PRODUCT REGISTER SIZE REGISTER (IPSR;A6 Hex)

The IPSR register provides an 8-bit binary value of how many bytes were loaded and stored in the last load of the Intermediate Product Register "P". Each subsequent transfer of the Intermediate Product Register "P" to the "n" modulus register will automatically also transfer the contents of the IPSR to the MSR. Transfers to the multiplier, multiplicand or exponential register will not alter MSR. The contents of the IPSR register are also automatically cleared following each transfer.

CO-PROCESSOR STATUS REGISTER (CPST;A7 Hex)

The CPST register provides an 8-bit binary value as to the status of the current Co-Processor operation. The lsb (CPST.0) indicates when the Co-Processor has completed a given operation. During exponential calculations the remaining seven bits CPST.7-CPST.1 will provide a level of completion of long calculations. When the Co-Processor is working on simple multiply operations, the seven most significant bits will remain cleared, but the lsb will indicate that the Co-Processor is active until such a calculation is completed.

REGISTRATION IDENTIFICATION REGISTER (RID;C6 Hex)

The Registration Identification Register provides the value of the 64-bit Lasered Identification (ID) value which is also accessible by an External Master One Wire Device. The contents of this register reflects the eight bit contents in one of eight registers pointed to by the ID pointer. The ID pointer is not viewable by the microcomputer, but is built into the RID register. A write to the RID register (with any data value) will clear the ID pointer to an initial state, but will not result in a software load of the write data into the RID register. The first read of RID following a write to RID will produce the contents of the least significant byte (LSB) of the Lasered ID number. Each read also post increments the ID pointer to allow the next read of the RID to provide the next higher register. A single write followed by eight reads of RID will provide all 64-bits of the Laser ID. Any write before the entire 64-bit value is read will realign the ID pointer back to the LSB of the ID. The ID pointer is also cleared when the microcomputer or co-processor enter into the STOP mode. To guarantee that the complete 64-bit word is read, it is important to temporarily disable all interrupts during the read of RID.

TIMED ACCESS REGISTER (TA;C7 Hex)

Timed access register values are entered as a pair of 8-bit numbers. The value AA Hex is entered first, followed immediately by a value of 55 Hex. This will then allow access for a limited time to any bit located in any register on the electronic module which requires a timed access relationship.

SECURITY DESTRUCT REGISTER (SDR;CD Hex)

DSM Destroy MOVX Memory:

When DSM is set to a "1", all of the on-chip MOVX memory will be instantaneously cleared. While programmed to a "1" the DSM bit will also disable all program access to the MOVX memory. When the DSM bit is cleared to a "0", the on-chip MOVX memory will function normally and standard access is enabled as per the BRAM and MXWEN bits located in the MXCNT register. Programming of the DSM bit to a "1" requires two back to back timed access functions to be executed prior to setting the bit.

ONE WIRE INPUT/OUTPUT REGISTER (OWIO;D2 Hex)

One Wire UART Input/Output Register Bits:

The One Wire UART Input/Output Register functions as both the output buffer for the microcomputer to write to the Input Data Registers on the One Wire UART, and the input buffer for the microcomputer to read the One Wire UART Output Data Registers. Each read of this register empties the Input Data Registers by one byte. Each write to this register loads one byte into the Output Data Registers.

TRUE TIME CLOCK INDEX REGISTER (TTCIR;FA Hex)

TTCIR.7-TTCIR.0: True Time Clock Index Register:

The True Time Clock Index Register provides the index address to each of the registers associated with the True Time Clock. The True Time Clock registers are broken into two groups. The first group (from 00 Hex to 05 Hex) provides the read interface to the True Time Clock value. The second group (11, 12, 21 and 22 Hex) provide the count down alarm registers and the alarm reload holding registers. The third group (from F8 Hex to FF Hex) provides calibration and clock controls. Each read or write to the TTC Data Register will automatically increment the 7 least significant bits associated with the index address in the TTCIR. Note that the incremented value will not alter the most significant bit and as such will remain within the respective group to which the TTCIR was first programmed.

SUBSECONDS TRUE TIME CLOCK REGISTER ONE (SITT)

SSITT Index Address-00 Hex

Subseconds True Time Clock Register Number One:

The SSITT register provides a fractional seconds count ($1/32768$ second through $1/512$ second increment) in the TTC and is accessed via the TTC Data Register, when pointed to by the TTCIR.

SUBSECONDS TRUE TIME CLOCK REGISTER TWO (SS2TT)

Subseconds True Time Clock Register Number Two:

The SS2TT register provides a fractional seconds count (from $1/256$ second through $1/2$ second increments) in the TTC and is accessed via the TTC Data Register, when pointed to by the TTCIR.

TRUE TIME CLOCK SECONDS REGISTER ONE (TTS1)

True Time Clock Seconds Register One:

The TTS1 register provides a TTC count for the first 8-bits (LSB) of the 32-bit seconds counter, $2^0$ through $2^7$ seconds. This register is accessed via the TTC Data Register, when pointed to by the TTCIR.

TRUE TIME CLOCK SECONDS REGISTER TWO (TTS2)

True Time Clock Seconds Register Two:

The TTS2 register provides a TTC count for the second byte of the 32-bit seconds counter, $2^8$ through $2^{15}$ seconds. This register is accessed via the TTC Data Register, when pointed to by the TTCIR.

TRUE TIME CLOCK SECONDS REGISTER THREE (TTS3)

True Time Clock Seconds Register Three:

The TTS3 register provides a TTC count for the third byte of the 32-bit seconds counter, 216 through 223 seconds. This register is accessed via the TTC Data Register, when pointed to by the TTCIR.

TRUE TIME CLOCK SECONDS REGISTER FOUR (TTS4)

True Time Clock Seconds Register Four:

The TTS4 register provides a TTC count for the fourth byte (MSB) of the 32-bit seconds counter, $2^{24}$ through $2^{31}$ seconds. This register is accessed via the TTC Data Register, when pointed to by the TTCIR.

SUBSECONDS ALARM REGISTER (SSAL)

Subseconds Alarm Register:

The SSAL register provides a fractional seconds count down alarm (from $1/256$ second through M second increments). Data is automatically loaded into the SSAL register from the Subseconds Alarm Reload Register (SSARR) following each write to SSARR. Following a count down to a zero value (in both the SSAL and SAL registers) the SSAL register will remain in a zero state until reloaded from the SSARR register. Data is also automatically loaded from SSARR following the execution of a One Wire Run or One Wire Interrupt command (independent of the One Wire Interrupt mask or priority). A read of the SSAL register is accessed via the TTC Data Register, when pointed to by the TTCIR.

SECONDS ALARM REGISTER (SAL)

Seconds Alarm Register:

The SAL register provides a seconds count down alarm from $2^0$ through $2^7$ seconds. Data is automatically loaded into the SAL register from the Seconds Alarm Reload Register (SARR) following each write to SARR. Following a count down to a zero value (in both the SSAL and SAL registers) the SAL register will remain in a zero state until reloaded from the SARR register. Data is automatically loaded from SARR following the execution of a One Wire Run or One Wire Interrupt command, (independent of the One Wire Interrupt mask or priority). A read of the SAL register is accessed via the TTC Data Register, when pointed to by the TTCIR.

SUBSECONDS ALARM RELOAD REGISTER (SSARR)

Subseconds Alarm Reload Register:

The SSARR register acts as a reload holding register for all period alarm values associated with the fractional seconds count down (from $\frac{1}{256}$ second through M second increments). A read or write to the SSARR is accessed via the TTC Data Register, when pointed to by the TTCIR.

SECONDS ALARM RELOAD REGISTER (SARR)

Seconds Alarm Reload Register:

The SARR register acts as a reload holding register for all period alarm values associated with the fractional seconds count down for the $2^0$ through $2^7$ seconds 8-bit counter. A read or write to the SARR register is accessed via the TTC Data Register, when pointed to by the TTCIR.

Resets and Program Mode Conditions

Resets

Resets on the electronic module are provided by two different sources. These are the Slave One Wire UART and Power Monitor.

Power-Up/Power-Down Reset/Power Fail Reset

The Power Fail Reset, also termed the Power-Down or Power-Up Reset, is automatically enabled each time the internal Vdd (supplied via the One Wire Slave UART pin) falls below the Vrst level. The electronic module will remain in combined Reset and STOP mode after power-up until the internal Vdd rises above the Vtrp level and the One Wire Slave UART has received an Interrupt or Run command from the external Master One Wire Controller. At this time the microcomputer is immediately released from reset and allowed to run. Since the processor is locked by an on-board ring oscillator, the processor will not require a crystal oscillator warm up and will not encounter any associated delay. Resets due to the loss and reasserting of power on the One Wire Slave UART pin are flagged by the POR bit in the PFR register. This loss of power will occur whenever the One Wire Slave UART pin loses connection with the One Wire Master and the internal parasitic power drops below the Vrst specification. Normal One Wire Data communications will not drop the internal Vdd below Vrst (as long as the processor remains in a STOP mode during One Wire communications), and as such will not produce a POR. A Power-On Reset will preset all bits (except the POR) to the same state provided by a traditional external RST. Note that the POR bit is only set by the Power-On Reset or the XVRST pin (XVRST is only active in Test Mode 0 and Emulation).

Slave One Wire UART

The Slave One Wire UART is totally controlled via an external master. One of the commands which can be sent to the UART is one that will actually force the microcomputer into a system reset. This command should not be confused with the One Wire Reset which is used to initiate all One Wire communications. The One Wire Command Reset sent to the UART is a specific command which follows the traditional One Wire Identification. This command will not hold the microcomputer in a reset, but will activate a one cycle pulse which will set a reset which can then be removed by the application of a One Wire Interrupt or One Wire Reset command when combined with the analog detection that Vdd has risen above the Vtrp level. The contents of the data in the UART Data Registers in the UART will not be disturbed as a result of this reset source. The One Wire UART Status (OWUS) command register value will, however, act as a means for the microcomputer to determine the source of the reset (see the OWUS SFR register). The One Wire Reset Command, as outlined above, will clear the OWUS command register to 0101,1111 binary.

Program Options

The electronic module has five different programmable technologies. Each of these is used to establish or control specific operating conditions as required during the manufacturing, testing, system application, and user customization of the product. Each of these are established at different points in the manufacturing process and are used to establish the following conditions.

1. ROM Program

ROM programming is preferably provided by a custom mask step during the silicon manufacturing process. The ROM mask is the first programming step in manufacturing and is used to create large pools of parts with a common purpose and/or application. The specific areas programmed by the ROM include the 32K byte program memory and the 1 K byte Test ROM.

2. Laser Fuses

The Laser Fuse is the second level programming step and provides a means to subdivide the ROM pool of products into smaller subsets. As a part of forming subsets, the laser fuse programming also provides a unique identification number to provide a unique name to each part manufactured. In addition to the 64-bit identification code, the laser also provides the mechanism to set the voltage trip points for Vrst, Vpfi, Vtrp, as well as disabling of the emulation bus and related controls. The laser fuses are programmed following the wafer probe step. Once the fuses have been programmed, the wafers are sent back to the fabrication process area to add nitride cover over all of the unused pad areas as well as all of the laser opening in the initial glass layer. Additional metal layers for the solder bump technology will also be provided following the application of the nitride coating.

3. Fusible Links

The Fusible Links are provided primarily to insure security. After final wafer processing, good die will be cut out of the wafer and attached to the PC board. In this configuration all future testing is completed through the One Wire Slave UART port pin (Test Mode 0 is disabled). These tests include (a) testing the product before burn-in, (b) providing a program during burn-in, (c) testing the part after burn-in, and finally, (d) testing the product after package assembly. Each of these tests will be accomplished using Test Mode 1 to load and run test code from the internal 6K bytes of SRAM. Since this is a security risk to the final product, two fusible links in the product will be programmed to disable all future test capabilities. The fusible links are essentially a metal line which is opened by sending sufficient current through the line to melt it. This programming step is achieved at final test. A security lock bit (SL) has also been added to allow the test program to test the circuits associated with the fusible links. This feature also provides additional security in the unlikely chance that the metal lines were to reconnect at a later date. An additional security mechanism is based on the True Time Clock. Note that the Data SRAM will also be cleared if the True Time Clock is stopped by either the OSCENA bit in the True Time Control register or by externally disabling the crystal oscillator. Both of these clearing functions by the True Time Clock operate independent of power from the OWSU or internal Vdd. Security is maintained in the lasered relationship (Test Mode 0 disabled—TM1EN laser fuse) where the part can only be tested using Test Mode 1, since the firmware in the Test ROM (executed following power-up) will be written to only test the MOVX SRAM using a CRC in Test Mode 1 and will also always clear all of the SRAM prior to executing any test command associated with a block load of the MOVX SRAM.

4. One Time Programmable Battery Backed Registers

Control and calibration registers used in the True Time Clock as well as the Security Lock bit (SL) are designed to support a one time only program capability. These register bits can be altered during manufacturing, but will be disabled from future writes once the programmable fusible links are programmed (TMDS0 and TMDS1) to disable future test mode entries.

5. Multiple Read/Write Programmable Battery Backed SRAM

All of the 6K bytes of Data SRAM, is designed as multiple read/write SRAM. These bytes provide the base memory for specific data that is used in the user defined application. All of the Data SRAM is subject to being cleared if the processor experiences a tamper related detection. The tamper related signals are generated by three potential relationships. The first of these is the loss of power as a function of shorted power supply (probing of the interlaced third layer power metal, or loss of backup battery supply). The second source is the detection that the True Time Clock oscillator has been stopped, and the third source is the software enable of the DSM bit in the Security Destruct Register.

OPERATIONAL MODES
OPERATING MODES—OVERVIEW:

The electronic module has four operating modes which support

1.) initial test probe evaluation,
2.) final test evaluation,
3.) emulation, and
4.) final user operation.

Modes: Description:
Initial Test
Probe Evaluation:

The initial Test Probe Evaluation makes use of two different test modes termed Test Mode 0 and Test Mode 1, as controlled by the TM1 bit in the Test Mode SFR Register. When combined with the TROMEN bit in the same register, the electronic module can be configured to provide one of four different memory maps to access and test all of the memory blocks and internal core logic. The testing is achieved by using the microcomputer core to run self-test evaluation code. The source of the code is supplied through either the external emulation bus (TM1=0) or from the internal SRAM (TM1=1). Internal SRAM code is loaded by first operating the part through the emulation bus.

Final Test Evaluation:

The Final Test Evaluation is totally controlled through the One Wire UART. Following the completion of the Initial Test Probe Evaluation, the part is lasered (see the TMLEN laser bit as outlined in the Functional Specification) to disable the ability to run from the emulation bus. With Test Mode 0 disabled (TM1=1), the microcomputer will initially start program code from a special 1K byte test ROM. All access will appear similar to the final product operation outlined in the Functional Specification, with the exception that the microcomputer will not execute from the final user's code space (32K bytes), but will instead run from a special test ROM. This mode is identical to the Test Mode 1 test used in the Initial Test Probe Evaluation, with the exception that the code which is used to load the internal SRAM is executed from the internal ROM as opposed to the emulation bus. In this configuration the microcomputer will be able to access all areas of the part including the verification of the users 32K bytes of program code.

Emulation:

The emulation mode is enabled by lasering the BPENAZ laser bit after the initial Test Probe Evaluation. Note that the TM1EN laser fuse is not lasered when the BPENAZ fuse is lasered. In this mode the electronic module will function in the standard user mode, but will access external memory using the emulation bus and related external emulation controls in place of the internal memory. This configuration is termed the Emulation mode since it allows the part to directly interface with an emulation system.

Final User Operation:

Once a part has completed the Final Test Evaluation, the part is programmed to execute code which will melt a set of internal metal fuses. These fuses operate in an OR'ed configuration and are also OR'ed with a software bit termed the Security Lock bit (SL is located in the MXCNT SFR). After these fuses are programmed (melted), and the part is powered down, all following powered up modes will only place the part into the users software. The SL bit is used to provide additional integrity to the metal fuses in the form of a battery backed bit, which functions in the identical manner as the fuses. The SL bit is also used in earlier testing to test the circuits associated with establishing the user mode of operation, without the need of melting the metal fuses. Once the User Mode is established the electronic module can never be placed into test mode again. At this stage the part will function as programmed by the users firmware.

ELECTRONIC MODULE STANDARD USER OPERATION
TIME

Figure 8:
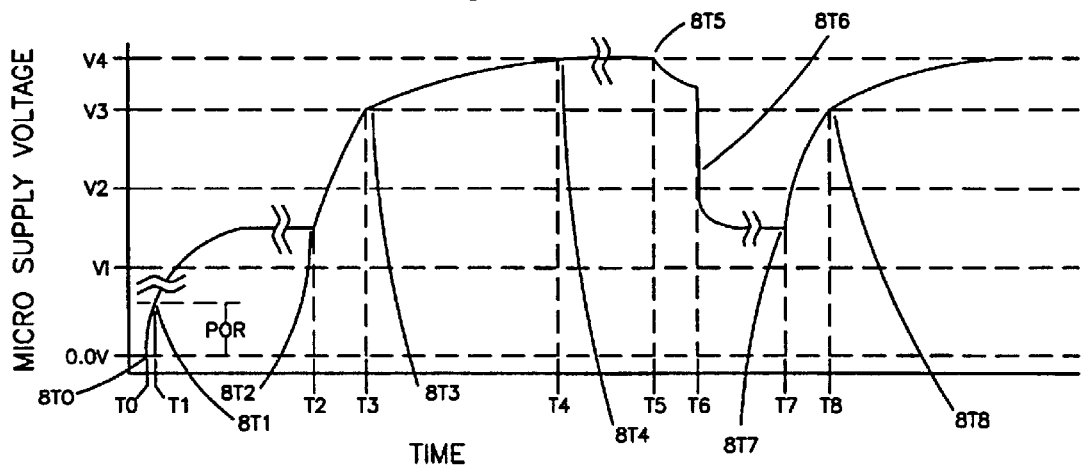
FIG. 8 depicts a graph of supply voltage to an exemplary module vs. time.

Referring to FIG. 8, the following describes an exemplary electronic module's power operations when connected to a high current one wire master source.

8T0

Initial contact of the electronic module to a master/host. The host will power the module through a 1.5K ohm pull-up. Internal power to chip is through parasitic diode.

8T1

During period between 8T0 to 8T1, internal POR will initialize all One Wire and Microcontroller circuits. Bandgap on processor begins to warm-up but is overridden by POR signal. The host will continue to power the module through a 1.5K ohm pull-up. Internal power to chip continues to be source through a parasitic diode from 8T1 to 8TO.

8T2

Period between 8T1 and 8T2 is period when One Wire communication takes place with One Wire UART. Microprocessor is held in low power (STOP) Reset state. Bandgap on processor is operating and establishes voltage reference. At the 8T2 time, One Wire command to start microcontroller is given by master One Wire. Master One Wire will also immediately activate a low impedance P-Channel in place of the initial 1.5K ohm pull-up. After the electronic module receives One Wire command to start microcontroller, hardware in the chip will allow the bandgap and associated opposing counsel-amps to turn on a P-Channel bypass to the parasitic diode, start the RC time constant rise in voltage between 8T2 and 8T3. Microprocessor operation is held off by bandgap waiting to detect V3 voltage level.

8T3

At 8T3 the detection of V3 allows the microprocessor to begin operation. System initiates internal oscillator, removes Reset and begins program execution. Note that the RC time constant rise time is slowed due to the loading condition of the microprocessor.

8T4

8T4 the operating current of the microprocessor and the supply current by the master come into equilibrium. This in most systems will continue to move up and down as the Master One Wire provides various levels of current.

8T5

Alarm from True Time clock interrupts microprocessor. Microprocessor is already either in a STOP or it will immediately go into a STOP mode. Stop mode will automatically turn off the bypass P-Channel and the module will revert to being powered by the parasitic diode. Internal voltage will slowly coast down to one diode drop down from Master external supply voltage. Voltage here may rise if no load condition by microprocessor allows Master to increase voltage to the module.

8T6

Master One Wire replaces the low impedance P-Channel for the 1.5K ohm pull-up. The Master One Wire then initiates a low signal pulse to the module and begins communication with One Wire UART from 8T6 to 8T7. In a similar fashion to the 8T2 to 8T3 period the microprocessor is held in low power (STOP) state, but not in RESET.

8T7

At the 8T7 time, One Wire command to start microcontroller is given by master One Wire. Master One Wire will also immediately activate a low impedance P-Channel in place of the initial 1.5K ohm pull-up. After the electronic module receives One Wire command to start microcontroller, hardware in the chip will allow the bandgap and associated opposing counsel-amps to turn on a P-Channel bypass to the parasitic diode, start the RC time constant rise in voltage between 8T7 and 8T8. Microprocessor operation is held off by bandgap wafting to detect V3 voltage level.

8T8

At T8 the detection of V3 allows the microprocessor to begin operation. System initiates internal oscillator, begins program execution. Note that the RC time constant rise time is slowed due to the loading condition of the microprocessor. Microprocessor may have been in a IDLE mode to allow the Co-Processor to operate prior to the True Time Alarm and as such will not be restarted. In this case the Co-Processor will continue were it left off and the microprocessor will remain in a IDLE mode.

Figure 9:
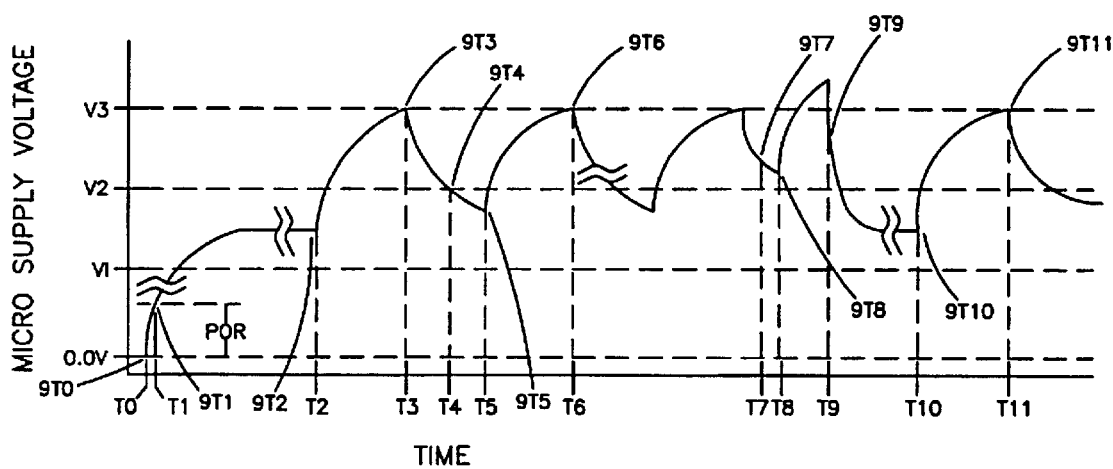
FIG. 9 depicts a graph of supply voltage to an exemplary module vs. time.

Referring to FIG. 9, the following describes an exemplary electronic module's power operation when connected to a low current master source. 9T0–9T2 periods are identical to those described above for high current masters.

9T3

At 9T3 the detection of V3 allows the microprocessor to begin operation. System initiates internal oscillator, removes Reset and begins program execution. Note that the voltage begins to decay as a result of the loading condition of the microprocessors operation.

9T4–9T5:

At 9T4 the bandgap reference opposing counsel-amps detect that the voltage has gone below the Power-Fail Interrupt level. If the microprocessor is running, it will experience an interrupt and will immediately go into a STOP mode at 9T5. If the microprocessor is in and IDLE mode the hardware will issue the STOP mode at 9T5 to stop the Co-Processor and leave the microprocessor in the IDLE mode (no microprocessor clocks). After the microprocessor and Co-Processor have been halted, the internal voltage supply will begin to charge toward the V3 level. Neither the microprocessor or Co-Processor are allowed to run until the V3 voltage level is detected.

9T6

At 9T6 the detection of V3 allows the microprocessor to begin operation. System initiates internal oscillator, begins program execution. As before note that the voltage begins to decay as a result of the loading condition of the microprocessors operation.

9T7

Alarm from True Time clock interrupts microprocessor. Microprocessor is already either in a STOP or it will immediately go into a STOP mode at 9T8.

9T8

All clocking in microprocessor and Co-Processor are stopped.

Stop mode will automatically turn off the bypass P-Channel and the chip will revert to being powered by the parasitic diode. Internal voltage will move to one diode drop down from Master external supply voltage. Voltage here may drop (as shown) or rise if no load condition by microprocessor allows Master to increase voltage to the electronic module.

9T9

Master One Wire replaces the low impedance P-Channel for the 1.5K ohm pull-up. The Master One Wire then initiates a low signal pulse to the electronic module and begins communication with One Wire UART from 9T6 to 9T7. In a similar fashion to the 9T2 to 9T3 period the microprocessor is held in low power (STOP) state but not in RESET.

9T10

At the 9T10 time, One Wire command to start microcontroller is given by master One Wire. Master One Wire will also immediately activate a low impedance P-Channel in place of the 1.5K ohm pull-up. After the electronic module receives One Wire command to start microcontroller, hardware in the chip will allow the bandgap, and associated opposing counsel-amps to turn on a P-Channel bypass to the parasitic diode, start the RC time constant rise in voltage between T10 and T11.

Microprocessor operation is held off by bandgap waiting to detect V3 voltage level, at T11.

9T11

At T11 the detection of V3 allows the microprocessor to begin operation. System initiates internal oscillator, begins program execution. Microprocessor may have been in a STOP mode to allow the Co-Processor to operate prior to the True Time Alarm and as such will not be restarted. In this case the Co-Processor will continue were it left off and the microprocessor will remain in a STOP mode.

Figure 10:
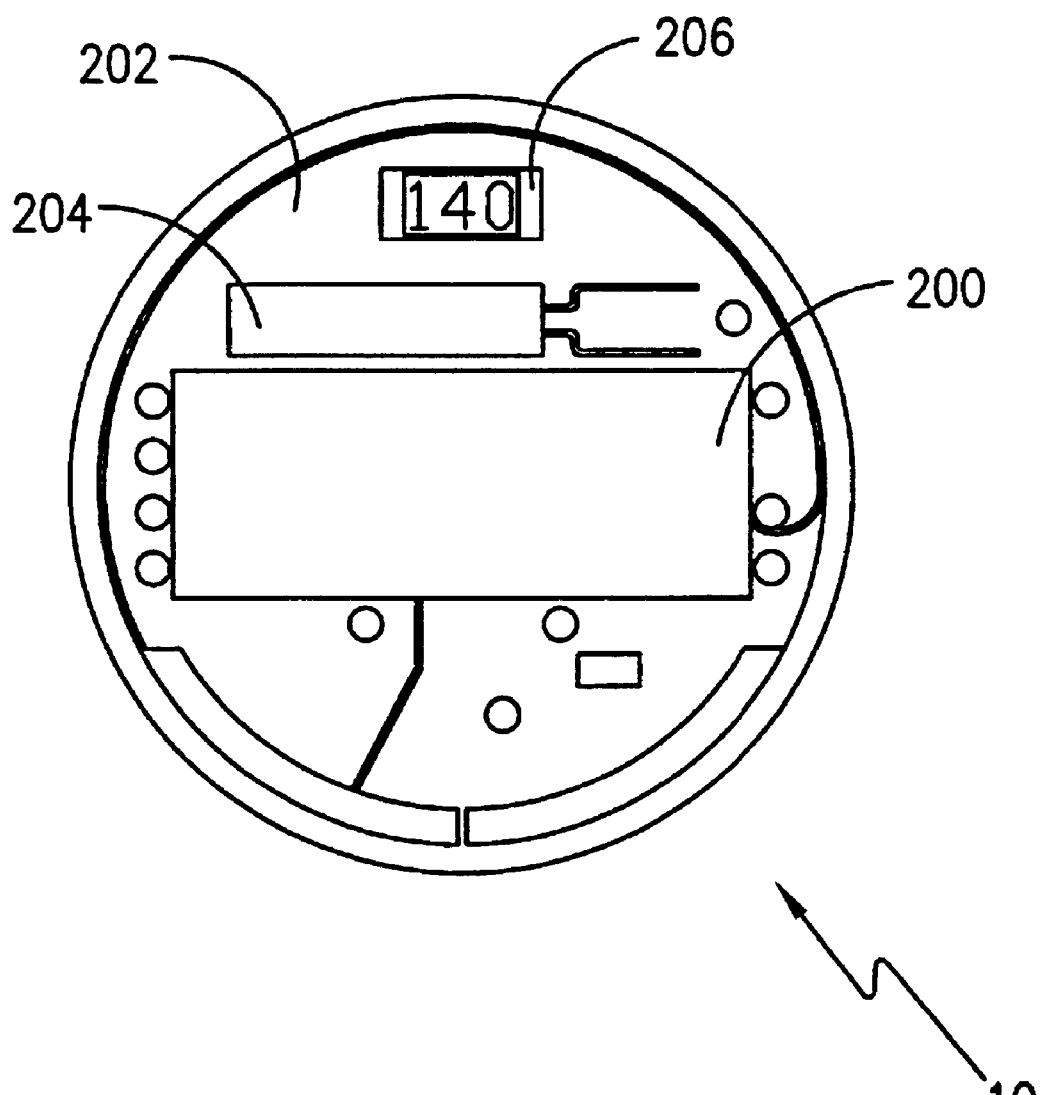
FIG. 10 depicts an exemplary module.

Preferred Packaging:

The electronic module's circuitry, along with a crystal oscillator, a capacitor, and a battery (not shown), are preferably incorporated onto a single integrated circuit. FIG. 10 depicts an embodiment of the electronic module. The integrated circuit has dimensions of 390 mils by 212 mils. The integrated circuit is flip-chip mounted on a printed circuit card wherein forty percent (40%) of the circuit card is covered by the single integrated circuit.

Figure 11:
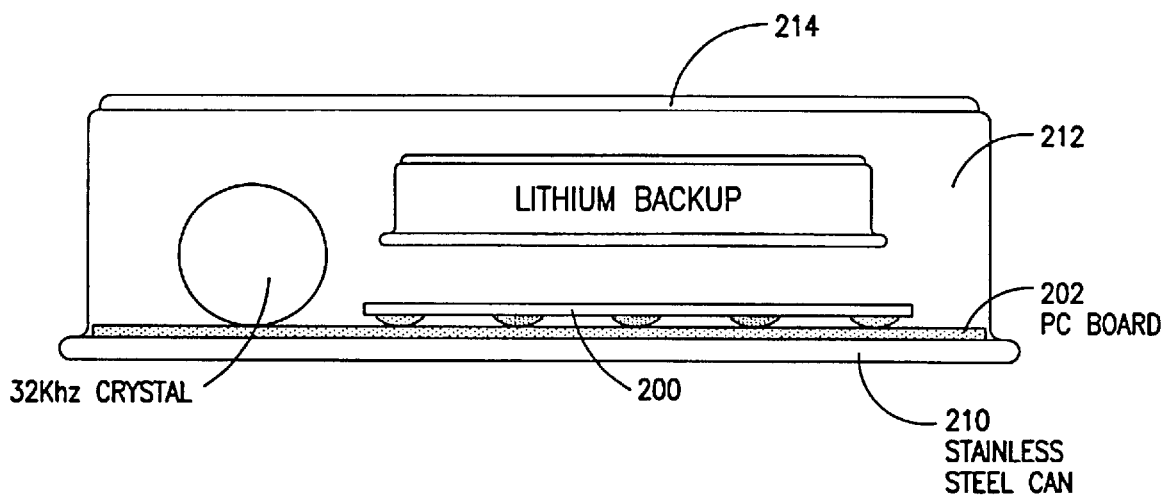
FIG. 11 depicts an exemplary module inside a token shaped can.

The electronic module can be placed is a small token sized container 210 having only two electrical contact areas, one for ground and one for the single wire communication and power connection. See FIG. 11.

Uses for The Electronic Module

The exemplary electronic module can be used for a vast variety of secure information transfer situations. For example, for storing secure information, for providing access to information or device uses, transferring of secure information including monetary equivalents such as cash, checks, credit, coupons, stamps, passport information, medical information, security information, and historic data. RSA encryption techniques are incorporated into the electronic module to enable secure data transfer between the electronic module and another device. Furthermore, security measures have been incorporated into the packaging of the electronic module to make the electronic module a secure data carrier and encryption device.

The electronic module can be placed in a token shaped device, a card, a wallet, a ring, a bracelet or any articulatable item.

Other uses of the electronic module, include but are not limited to, secure E-mail, digital notary service, and electronic signature service, cash or money equivalent dispenser, secure transaction over a communication network, software authorization and usage metering, postal meter service, creation of private and public encryption key sets, taxation of transaction volume, RSA encryption, encryption by Blaze method, and microprocessor based secure calculations.

As is clearly seen, the present invention is a significant invention in the art. The present invention is believed to be especially effective when configured and employed as described herein, however, those skilled in the art will readily recognize that numerous variations and substitutions may be made in the invention and its use and configuration to achieve substantially the same results as achieved by the embodiments and, in particular, the preferred embodiment expressly described herein. Each of those variations is intended to be included in the description herein and forms a part of the present invention. The foregoing detailed description is, thus, to be clearly understood as being given by way of illustration and example only, the spirit and scope of the present invention being limited solely by the appended claims.

What is claimed is:

1. An integrated electronic circuit providing microprocessor and co-processor capabilities, said electronic circuit comprising:

an interface for bidirectionally interfacing said integrated electronic circuit to another device;

a UART circuit connected to said interface;

a microprocessor core connected to said UART circuit a RAM memory coupled to said microprocessor core and a clearing circuit to clear at least a portion of the contents of said RAM memory upon the detection of tamper related event.

2. The integrated electronic circuit of claim 1, further comprising a read only memory (ROM) that is programmed via a custom mask provided in the manufacturing process, said ROM being connected to said microprocessor core.

3. The integrated electronic circuit of claim 1, further comprising a coprocessor, connected to said microprocessor core, for computing encryption related mathematics.

4. The integrated electronic circuit of claim 1, further comprising a random number generator and a coprocessor circuit connected to said microprocessor core, said combination of at least said random number generator and said coprocessor circuit being for generating encryption key pairs.

5. The integrated electronic circuit of claim 1, further comprising a random access memory circuit, and an alarm circuit for determining whether said integrated electronic circuit is being tampered with and for erasing the contents said random access memory when said integrated electronic circuit is being tampered with.

6. The integrated electronic circuit of claim 1, further comprising a random access memory circuit connected to said microprocessor core, and an alarm circuit for resetting said integrated electronic circuit if an alarm condition occurs.

7. The integrated electronic circuit of claim 1, further comprising a random access memory circuit (RAM), connected to said microprocessor core.

8. The integrated electronic circuit of claim 7, wherein said RAM is SRAM.

9. The integrated electronic circuit of claim 1, wherein said interface is a single wire bus interface.

10. The integrated electronic circuit of claim 1, wherein said UART is a one wire UART.

* * * * *

UNITED STATES PATENT AND TRADEMARK OFFICE
CERTIFICATE OF CORRECTION

PATENT NO. : 6,219,789 B1  Page 1 of 1
DATED : April 17, 2001
INVENTOR(S) : Wendell Little et al.

It is certified that error appears in the above-identified patent and that said Letters Patent is hereby corrected as shown below:

Column 1,
Line 10, replace "1995" with -- 1994 --
Line 21, replace "1995" with -- 1994 --

Column 13,
Line 53, replace "1i" with -- 1 --

Column 24,
Line 4, replace "$(P(ip) + a(i)$" with -- $(P(i) + a(i)$ --

Column 26,
Line 8, insert "msec" after 852

Column 32,
Line 56, replace "M" with -- 1/2 --

Column 33,
Line 20, replace "M" with -- 1/2 --

Column 36,
Line 2, replace "TMLEN" with -- TM1EN --

Column 37,
Line 25, insert -- At -- before 8T4

Signed and Sealed this

Nineteenth Day of February, 2002

*Attest:*

*Attesting Officer*

JAMES E. ROGAN
*Director of the United States Patent and Trademark Office*